(12) United States Patent
Xu et al.

(10) Patent No.: US 12,480,773 B2
(45) Date of Patent: Nov. 25, 2025

(54) NETWORK SUPPORT FOR DYNAMIC VEHICLE ROUTING

(71) Applicant: HERE Global B.V., Eindhoven (NL)

(72) Inventors: Jingwei Xu, Buffalo Grove, IL (US); Arnold Sheynman, Northbrook, IL (US); Bruce Bernhardt, Wauconda, IL (US); Yuxin Guan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 505 days.

(21) Appl. No.: 17/127,515

(22) Filed: Dec. 18, 2020

(65) Prior Publication Data
US 2022/0196426 A1    Jun. 23, 2022

(51) Int. Cl.
*G01C 21/34* (2006.01)
*H04W 24/10* (2009.01)

(52) U.S. Cl.
CPC ..... *G01C 21/3492* (2013.01); *G01C 21/3407* (2013.01); *G01C 21/3415* (2013.01); *H04W 24/10* (2013.01)

(58) Field of Classification Search
CPC ............ G01C 21/3492; G01C 21/3407; G01C 21/3415; G01C 21/3461; G01C 21/34; G01C 21/343; H04W 24/10; H04W 4/024; H04W 4/40; H04W 4/027; H04W 40/026; H04W 40/02; H04W 40/20; G05D 1/0276; G05D 1/0088; G05D 2201/0213; G05D 1/028; G05D 1/0022; G01S 13/931
See application file for complete search history.

(56) References Cited

U.S. PATENT DOCUMENTS

| | | | |
|---|---|---|---|
| 6,871,139 B2 | 3/2005 | Liu | |
| 7,079,945 B1 * | 7/2006 | Kaplan | G01C 21/3896 340/988 |
| 7,565,155 B2 * | 7/2009 | Sheha | G01C 21/3438 455/456.2 |
| 8,010,284 B2 | 8/2011 | Kaplan | |

(Continued)

FOREIGN PATENT DOCUMENTS

WO    WO2020221443    * 11/2020    ............. H04L 12/24

OTHER PUBLICATIONS

Chen, Shanzhi, et al. "Vehicle-to-Everything (V2X) Services Supported by LTE-Based Systems and 5G." IEEE Communications Standards Magazine 1.2. Jun. 2017. (pp. 70-76).

*Primary Examiner* — Redhwan K Mawari
(74) *Attorney, Agent, or Firm* — Lempia Summerfield Katz LLC

(57) ABSTRACT

Systems and methods for vehicle routing may be based on wireless network performance data. A vehicle route includes one or more path segments included in the route based on the wireless performance data. The vehicle route may be updated based on updated wireless performance data. Driving assistance features of a vehicle may be enabled by the wireless performance data, and different driving assistance features may be enabled or disabled on the vehicle route according to changes in wireless performance data. As the vehicle traverses the route, the driving assistance features may be enabled or disabled based on the wireless performance data for the path segment. The vehicle route may be updated to continue to enable a set of the driving assistance features.

20 Claims, 12 Drawing Sheets

(56) References Cited

U.S. PATENT DOCUMENTS

| | | | | |
|---|---|---|---|---|
| 8,311,741 B1* | 11/2012 | Lawther | G08G 1/096811 | 701/527 |
| 8,781,512 B1* | 7/2014 | Grochla | H04W 48/18 | 455/524 |
| 8,787,917 B1* | 7/2014 | Barrett | G01C 21/3461 | 455/445 |
| 8,818,351 B1* | 8/2014 | Crossno | H04W 4/029 | 455/226.1 |
| 8,818,719 B1* | 8/2014 | Thanayankizil | G07C 5/008 | 340/988 |
| 9,057,620 B2 | 6/2015 | Dave et al. | | |
| 9,086,291 B1* | 7/2015 | Bhatia | G01C 21/3461 | |
| 9,103,677 B2* | 8/2015 | Bauchot | G01C 21/343 | |
| 9,603,158 B1 | 3/2017 | Ross | | |
| 9,606,218 B2* | 3/2017 | Stenneth | G01C 21/34 | |
| 9,674,880 B1* | 6/2017 | Egner | A61B 5/14542 | |
| 9,689,697 B2* | 6/2017 | Sorokin | G01C 21/3461 | |
| 9,709,409 B2 | 7/2017 | Dave | | |
| 9,858,824 B1* | 1/2018 | Zogg | G08G 5/0091 | |
| 10,255,824 B2 | 4/2019 | Pearlman et al. | | |
| 10,520,321 B1 | 12/2019 | Kukreja | | |
| 10,746,558 B2* | 8/2020 | Muldoon | H04W 4/024 | |
| 10,789,835 B2* | 9/2020 | Kislovskiy | G01C 21/3461 | |
| 10,795,358 B2* | 10/2020 | Asakura | G01C 21/3415 | |
| 10,932,180 B2* | 2/2021 | Hassan | H04W 4/029 | |
| 11,112,254 B2 | 9/2021 | Dave et al. | | |
| 11,157,008 B2* | 10/2021 | Dean | G06N 20/00 | |
| 11,514,733 B1 | 11/2022 | Krotosky | | |
| 11,520,321 B2 | 12/2022 | Pandev | | |
| 11,561,107 B2* | 1/2023 | Magzimof | H04B 17/373 | |
| 11,599,846 B2 | 3/2023 | Neumann | | |
| 11,640,764 B1 | 5/2023 | Alonso Lopez | | |
| 11,673,557 B2 | 6/2023 | Lin et al. | | |
| 11,673,584 B2 | 6/2023 | Wang et al. | | |
| 11,726,495 B2* | 8/2023 | Maveddat | G01C 21/3453 | 701/24 |
| 11,829,939 B2 | 11/2023 | Neumann | | |
| 11,868,145 B1 | 1/2024 | Lopez | | |
| 2004/0175183 A1* | 9/2004 | Willhoeft | G01S 17/931 | 398/140 |
| 2007/0143499 A1* | 6/2007 | Chang | G06Q 10/10 | 700/100 |
| 2010/0088025 A1* | 4/2010 | Garg | G01C 21/3461 | 701/533 |
| 2010/0153001 A1* | 6/2010 | Bauchot | G01C 21/3867 | 701/533 |
| 2010/0207787 A1* | 8/2010 | Catten | G08G 1/096716 | 340/905 |
| 2011/0026008 A1* | 2/2011 | Gammenthaler | G01S 17/88 | 356/28 |
| 2012/0083996 A1* | 4/2012 | Tas | G08G 1/0133 | 701/119 |
| 2013/0024107 A1* | 1/2013 | Xie | H04W 4/029 | 701/423 |
| 2013/0308470 A1* | 11/2013 | Bevan | H04W 36/322 | 370/252 |
| 2014/0046585 A1* | 2/2014 | Morris, IV | G01C 21/00 | 701/400 |
| 2014/0067257 A1* | 3/2014 | Dave | H04W 4/40 | 701/423 |
| 2014/0132425 A1* | 5/2014 | Buckel | G08G 1/08 | 340/933 |
| 2014/0257695 A1* | 9/2014 | Annapureddy | G08G 1/096811 | 701/537 |
| 2014/0379252 A1* | 12/2014 | Sorokin | G01C 21/3461 | 701/426 |
| 2015/0146703 A1* | 5/2015 | Son | H04W 84/12 | 370/338 |
| 2015/0172908 A1* | 6/2015 | Hadinata | H04W 48/16 | 455/421 |
| 2015/0304983 A1* | 10/2015 | Krening | H04W 64/003 | 370/254 |
| 2016/0044129 A1* | 2/2016 | Bergmann | H04L 67/5681 | 455/406 |
| 2016/0178381 A1* | 6/2016 | Lynch | G01C 21/3848 | 701/41 |
| 2016/0282129 A1* | 9/2016 | Wang | H04W 4/02 | |
| 2016/0300492 A1* | 10/2016 | Pasko | G08G 5/0043 | |
| 2016/0371985 A1* | 12/2016 | Kotecha | G06Q 10/047 | |
| 2017/0110008 A1* | 4/2017 | Benhammou | G08G 1/012 | |
| 2017/0208540 A1* | 7/2017 | Egner | H04W 64/003 | |
| 2017/0272972 A1* | 9/2017 | Egner | H04L 47/2441 | |
| 2017/0370742 A1* | 12/2017 | Schumann | G01C 21/26 | |
| 2018/0023968 A1* | 1/2018 | Stuchfield | G01C 21/3453 | 701/416 |
| 2018/0066960 A1* | 3/2018 | Tateishi | G05D 1/0274 | |
| 2018/0107216 A1* | 4/2018 | Beaurepaire | G06Q 30/0261 | |
| 2018/0194365 A1* | 7/2018 | Bae | B60W 50/0098 | |
| 2018/0292833 A1* | 10/2018 | You | G05D 1/0212 | |
| 2018/0376357 A1* | 12/2018 | Tavares Coutinho | H04W 64/003 | |
| 2019/0041225 A1* | 2/2019 | Winkle | G01C 21/3453 | |
| 2019/0041227 A1* | 2/2019 | Shetty | G05D 1/0285 | |
| 2019/0043251 A1* | 2/2019 | Winkle | G08G 5/0091 | |
| 2019/0043372 A1* | 2/2019 | Winkle | G08G 5/0043 | |
| 2019/0120629 A1* | 4/2019 | Gum | H04W 4/02 | |
| 2019/0137287 A1* | 5/2019 | Pazhayampallil | G05D 1/0291 | |
| 2019/0325747 A1* | 10/2019 | Fleming | G01C 21/3484 | |
| 2019/0383624 A1* | 12/2019 | Magzimof | H04W 8/08 | |
| 2019/0390963 A1* | 12/2019 | Kumar | H04W 4/40 | |
| 2020/0008044 A1* | 1/2020 | Poornachandran | H04L 41/5019 | |
| 2020/0029233 A1* | 1/2020 | Gallagher | H04B 17/27 | |
| 2020/0088529 A1 | 3/2020 | Kukreja | | |
| 2020/0088535 A1* | 3/2020 | Tiedje | G01C 21/3453 | |
| 2020/0159218 A1* | 5/2020 | Iijima | G01C 21/3415 | |
| 2020/0191582 A1* | 6/2020 | Urano | B60W 60/00253 | |
| 2020/0201315 A1 | 6/2020 | Gogna | | |
| 2020/0223453 A1* | 7/2020 | Le Chaffotec | B60W 60/0057 | |
| 2020/0264629 A1* | 8/2020 | Maveddat | G05D 1/0276 | |
| 2021/0029612 A1* | 1/2021 | Hassan | G01C 21/3461 | |
| 2021/0063178 A1* | 3/2021 | Modi | G01C 21/3667 | |
| 2021/0112423 A1* | 4/2021 | Maheshwari | H04W 36/322 | |
| 2021/0114616 A1* | 4/2021 | Altman | H04W 76/15 | |
| 2021/0146947 A1* | 5/2021 | Ji | G01S 13/867 | |
| 2021/0327270 A1 | 10/2021 | Ferguson | | |
| 2021/0403017 A1* | 12/2021 | Bielby | B60W 50/085 | |
| 2022/0018676 A1* | 1/2022 | Haugaard | G01C 21/3617 | |
| 2022/0057221 A1* | 2/2022 | Strygulec | H04W 4/024 | |
| 2022/0196425 A1* | 6/2022 | Xu | H04W 24/10 | |
| 2022/0196426 A1 | 6/2022 | Xu | | |
| 2022/0217059 A1* | 7/2022 | Vidal | H04L 41/40 | |
| 2023/0133992 A1* | 5/2023 | Ganju | H04B 17/27 | 370/252 |
| 2023/0150540 A1 | 5/2023 | Kim | | |
| 2024/0098537 A1* | 3/2024 | Shrivastava | G01C 21/3697 | |

* cited by examiner

NETWORK SUPPORT FOR DYNAMIC VEHICLE ROUTING

FIELD

The following disclosure relates to determining a vehicle route based on network performance.

BACKGROUND

Mobile devices, including vehicles, may connect to wireless networks, such as wireless cellular networks. The connection may be used to exchange data between the mobile device and a service or one or more computers connected to the internet. The mobile devices may send data over the wireless network, such as a location, speed, heading, or a request for a route. The mobile devices may receive, for example, the route over the wireless network. The route may show how to get from a starting location to a destination over one or more paths, for example, surface roads or highways.

Advances in wireless network technology may allow for more mobile devices to connect to a single access point and for greater speeds over the connection. However, a reduction in the range of a wireless connection to a wireless access point of the network may accompany the increased speed and greater number of connected devices. Without a greater number or density of wireless access points, mobile devices may be out of range of wireless access points having the advanced network technologies and may instead connect to legacy wireless networks having reduced performance.

Additionally, as adoption of advanced network technology by mobile devices increases, limited wireless network resources may be consumed by even greater numbers of mobile devices, and network performance for each mobile device may be reduced. For example, as the number of mobile devices connected to a single wireless access point increases, the bandwidth or speed of each mobile device may decrease. Applications on the mobile devices that rely on high speed communications to the internet may experience reduced functionality as a result.

SUMMARY

In one embodiment, a method for vehicle routing includes receiving a wireless network performance data for a wireless network and associated with a plurality of path segments, determining a score for one or more path segments of the plurality of path segments, determining a vehicle route based on the score of the one or more path segments, and outputting the vehicle route. The score is based on the wireless network performance data for the one or more path segments.

In one embodiment, a system for vehicle routing includes a network resource monitor configured to receive wireless network performance data associated with a plurality of path segments, a route composer configured to determine a score for the plurality of path segments and determine a route based on the score of the plurality of path segments, and a dispatcher configured to output the route. The score is based on whether or not the wireless network performance data associated with the plurality of path segments meets or exceeds a driving assistance data requirement.

In one embodiment, a non-transitory computer-readable medium includes instructions that when executed are operable to receive a vehicle routing request including a driving assistance capability of an vehicle and a driving assistance data requirement to enable the driving assistance capability, receive a wireless network performance data associated with a plurality of path segments, determine a score for the plurality of path segments, determine a vehicle route based on the score of the one or more path segments, and output the vehicle route. The score is based on whether or not the wireless network performance data associated with the path segment fulfills the driving assistance data requirement. The wireless network performance data for the vehicle route at least partially enables the driving assistance capability.

In one embodiment, a method for adaptive routing includes sending a vehicle routing request, receiving a vehicle route in response to the vehicle routing request, and receiving, at a time after the vehicle route is received, a revised vehicle route based on a second wireless network performance data for the plurality of path segments. The vehicle route traverses one or more path segments of a plurality of path segments. The vehicle route is based on first wireless network performance data for the plurality of path segments. The revised vehicle route includes less than all of the one or more path segments of the vehicle route.

In one embodiment, a vehicle navigation system includes a vehicle status reporter configured to send vehicle probe data including a driving assistance data requirement, a plurality of available driving assistance capabilities, a first driving assistance capability of the one or more driving assistance capabilities, a driving assistance data requirement for the one or more driving assistance capabilities, and a wireless network performance data of a wireless network covering the vehicle. The first driving assistance capability is active. The system includes a driving assistance command module configured to receive, when the wireless network performance data does not meet or exceed the driving assistance data requirement for the first driving assistance capability, a navigation command switching the vehicle from the first driving assistance capability to a second driving assistance capability of the plurality of available driving assistance capabilities.

In one embodiment, a non-transitory computer-readable medium includes instructions that when executed are operable to send vehicle probe data includes a vehicle route, receive a wireless network performance data of a wireless network for the plurality of path segments, and receive a navigation command switching a vehicle from a first driving assistance capability to a second driving assistance capability when the wireless network performance data for a path segment of the plurality of path segments fails to meet or exceed the a driving assistance data requirement for the first driving assistance capability. The vehicle route includes a plurality of path segments.

BRIEF DESCRIPTIONS OF THE DRAWINGS

Exemplary embodiments of the present invention are described herein with reference to the following drawings.

DETAILED DESCRIPTION

Figure 1:
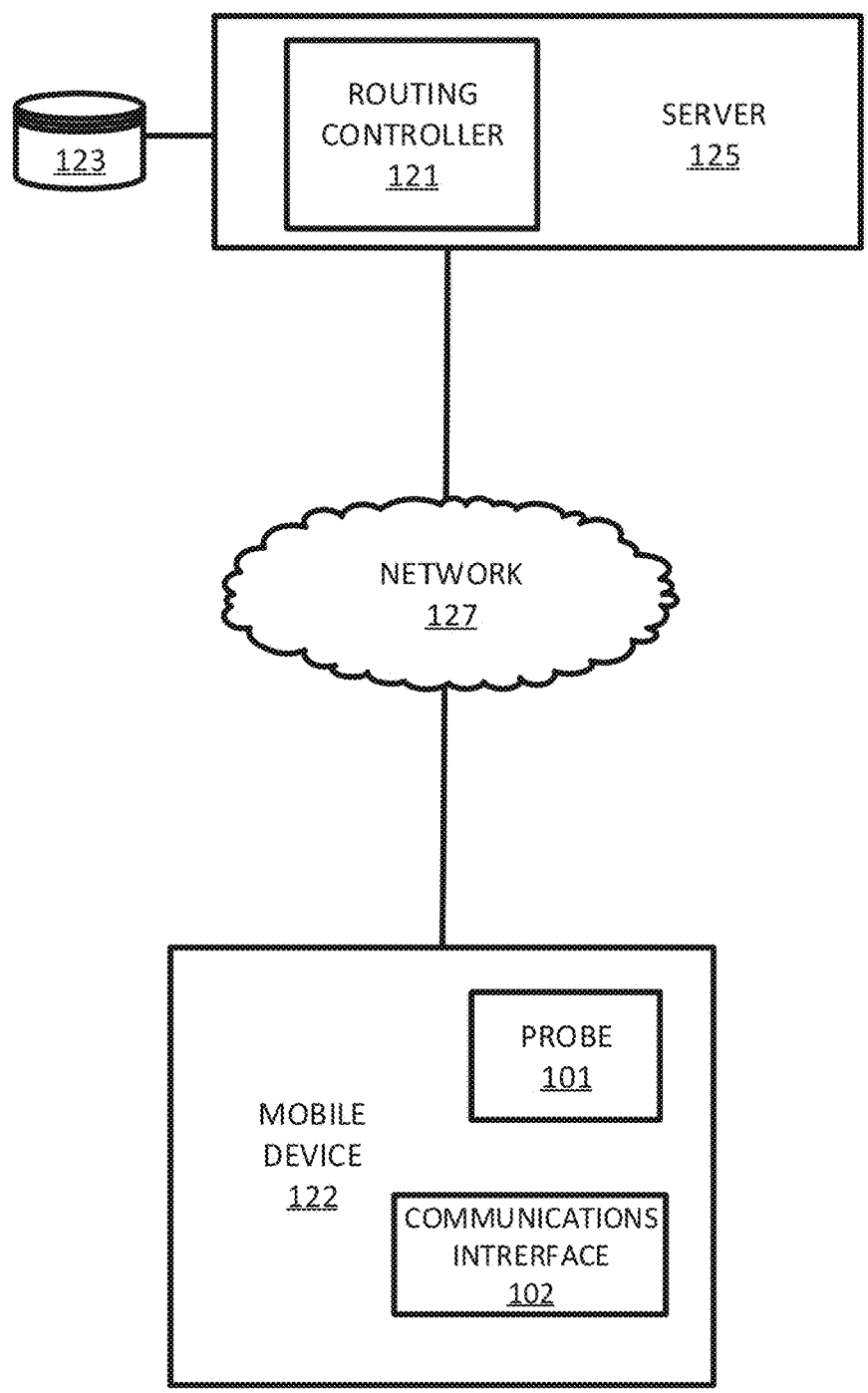
FIG. 1 illustrates a first embodiment of a system for route planning.

A fifth-generation wireless network standard (5G) has been developed and produced. A sixth-generation wireless standard (6G) and further developments are currently under investigation with deployment pending, possibly while 5G technology is being deployed.

One use case for 5G is mobile devices. 5G technology may cover more than a million mobile devices per square kilometer (cell), while the fourth-generation wireless network standard (4G) may cover only 100,000 mobile devices per square kilometer. 5G standards support backward compatible capabilities, such that 5G enabled mobile devices may "switchover" to 4G or even third-generation (3G) or second-generation (2G) networks in areas where 5G access is not available. In this way, mobile devices may connect to the fastest or most advanced network available, whether 5G or another wireless 5G networks may support applications like the internet of things (IoT), driver assistance (e.g. autonomous driving), and even private networks outside of the normal public internet access.

Diver assistance features aid drivers in driving and parking a vehicle. Such features may sometimes be referred to as "automated driving," "highly assisted driving," "advanced driving assistance systems," or "autonomous driving," but driver assistance features may have different levels of sophistication, ranging from simple warning to complex systems that may drive a car without user input. The driver assistance features may be enabled by an engine control management (ECM) system on a vehicle. The driver assistance features may rely on different sensor technologies and high definition (HD) MAP or dynamic backend content, including traffic information services, to aid the in-vehicle ECM system for the right decision strategy as how to drive along the road network The society of automotive engineers (SAE) sorts driver assistance features into different levels, ranging from 0 to 5.

Level 0: An automated system may issue warnings and may momentarily intervene, but has no sustained vehicle control.

Level 1: The driver and the automated system share control of the vehicle. Examples of level 1 include adaptive cruise control (ACC), where the driver controls steering and the automated system controls speed, and parking assistance, where steering is automated while speed is manual. Level 1 may be referred to as "hands off" because the driver should be prepared to retake full control of the vehicle at any time. Lane keeping assistance (LKA) Type II is a further example of level 1 driver assistance.

Level 2: The automated system takes full control of the vehicle (accelerating, braking, and steering). The driver must monitor the driving and be prepared to intervene immediately at any time if the automated system fails to respond properly. Though level 2 driver assistance may be referred to as "hands off" because the automated system has full control of acceleration braking and steering, in some cases, contact between hand and steering wheel is often required to confirm that the driver is ready to intervene. In this way, the driver supervises the actions of the driver assistance features.

Level 3: The driver can safely turn their attention away from the driving tasks, e.g. the driver can text or watch a movie. Level 3 may be referred to as "eyes off." The vehicle may handle situations that call for an immediate response, such as emergency braking. The driver should still be prepared to intervene within some limited period of time, often specified by the manufacturer, when called upon by the vehicle to do so. The car has a so-called "traffic jam pilot" that, when activated by a human driver, allows the car to take full control of all aspects of driving in slow-moving traffic at up to 60 kilometers per hour (37 miles per hour). However, the function works only on highways with a physical barrier separating one stream of traffic from oncoming traffic.

Level 4: Similar automated control as in level 3, but no driver attention is required for safety. For example, the driver may safely go to sleep or leave the driver's seat. Level 4 may be referred to as "mind off" or "driverless." Self-driving in level 4 may be supported only in limited spatial areas (e.g. within geofenced areas) or under special circumstances, like traffic jams. Outside of these areas or circumstances, the vehicle may safely abort the trip (e.g. park the car) if the driver does not retake control.

Level 5: No human intervention is required to drive the vehicle. As a result, a vehicle with level 5 Driver assistance features may not require or have a steering wheel installed. An example would be a robotic taxi. Level 5 driver assistance may be referred to as "autonomous driving" because the vehicle may drive on a road without human intervention. In many cases, it is used as the same term as a driverless car, or a robotic car.

A fast network connection supports many driver assistance features. Greater numbers of vehicles with driver assistance features may made roadways safer, given advanced environment sensing capabilities, development of machine learning models over different kind of sensor technologies (e.g. camera, radar, light detection and ranging (LIDAR)), vehicle to vehicle communications, and vehicle to infrastructure communication, all supported by low-latency, high capacity, high bandwidth throughput, and high coverage wireless networks like 5G networks. Many driving assistance features require extensive data processing, as well as frequent communication between a backend server and one or more vehicles.

However, gaps in wireless network coverage and performance may hinder some driving assistance features. For example, a set or level of driving assistance features may require a minimum wireless network connection performance (e.g. speed, bandwidth, or network generation/type). If a vehicle is driving using the set of driver assistance features and the available wireless network performance falls below the minimum, the vehicle may either switchover to a different set of driving assistance features with a lower wireless network performance requirement, or may abort the trip (e.g. by parking the vehicle), at least until the available wireless network performance is restored. In both the case of the switchover and parking the vehicle, the safety of passengers in the vehicle and neighboring vehicle may be reduced.

To increase safety, routes may be planned that have or enable a high level of driving assistance features. For example, a route may be planned to have 5G wireless coverage (or wireless coverage required to enable driving assistance features) along all or many of the paths/nodes of the route. Green Autonomous Vehicle Driving (GAVD) refers to adjusting a vehicles route and planning to ensure the vehicle is able to travel through a route without requiring the disabling of autonomous driving features. In this way, safety may be increased by ensuring that vehicles are routed along paths that enable the highest possible level of driving assistance features. In some cases, a planned route may be updated based on wireless performance. Further, eliminating stopping or changeovers along a route may reduce wasted time and energy while driving.

By observing wireless performance data and the changes in wireless performance data over time, route planning may account for the specific data requirements of driving assistance features. Route planning based only traffic or incident data may not predict whether a wireless network for a path segment will enable a set of driving assistance features generally or at a specific time. As a result, a route planned on traffic and incident data may include undesirable changeovers between different levels of driving assistance features, decreasing the safety of a vehicle. In contrast, route planning with wireless performance data may reduce changeovers in a route, update a route dynamically based on new wireless performance data to avoid changeovers, and predict when a changeover will occur, ensuring safe transitions between different sets of driving assistance features. In this way, the wireless performance data extends a technical functionality of a route planner, resulting in increased use of driving assistance features, and, thereby, increased vehicle safety on the road.

FIG. 1 illustrates an example system for route planning including a mobile device 122, a server 125, and a network 127. Additional, different, or fewer components may be included in the system. The following embodiments may be entirely or substantially performed at the server 125, or the following embodiments may be entirely or substantially performed at the mobile device 122. In some examples, some aspects are performed at the mobile device 122 and other aspects are performed at the server 125.

The mobile device 122 may include a probe 101 or position circuitry such as one or more processors or circuits for generating probe data. The probe points are based on sequences of sensor measurements of the probe devices collected in the geographic region. The probe data may be generated by receiving GNSS signals and comparing the GNSS signals to a clock to determine the absolute or relative position of the mobile device 122. The probe data may be generated by receiving radio signals or wireless signals (e.g., cellular signals, the family of protocols known as WIFI or IEEE 802.11, the family of protocols known as Bluetooth, or another protocol) and comparing the signals to a pre-stored pattern of signals (e.g., radio map). The mobile device 122 may act as the probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In this case, there are additional fields like speed and heading based on the movement (i.e., the probe reports location information when the probe 101 moves a threshold distance). The predetermined time interval for generating the probe data may be specified by an application or by the user. The interval for providing the probe data from the mobile device 122 to the server 125 may be the same or different than the interval for collecting the probe data. The interval may be specified by an application or by the user. In some other cases, the probe data is collected dynamically or at different rates. For example, the rate at which the probe data is received may vary based on a trajectory or dynamic behavior of a vehicle or mobile device 122 (e.g. whether the mobile device 122 is travelling at one speed or accelerating/decelerating), a complexity of a path travelled by the mobile device 122 currently or in the future (e.g. whether the mobile device 122 is approaching an intersection, off ramp, roundabout), or traffic conditions (e.g. accumulation or dissipation of traffic congestion).

A communications interface 102 may establish, manage, and/or facilitate a wireless connection between the mobile device 122 and the network 127. The communications interface 102 may connect to a network 127 using the 5G standard. In some cases, the communications interface 102 may be able to connect with other standards (e.g. 4G, 3G, 2G) when 5G networks are unavailable. Additionally or alternatively, the communications interface 102 may generate and/or output measures of the performance of the network 127. For example, the communications interface 102 may measure a current or historical speed (download/upload), bandwidth (download/upload), latency, or other performance data of the connection to the network 127.

Communication between the mobile device 122 and the server 125 through the network 127 may use a variety of types of wireless networks. For example, the network 127 may be a cellular network. The cellular technologies may be analog advanced mobile phone system (AMPS), the global system for mobile communication (GSM), third generation partnership project (3GPP), code division multiple access (CDMA), personal handy-phone system (PHS), and 4G or long-term evolution (LTE) standards, 5G, DSRC (dedicated short-range communication), or another protocol.

Figure 2:
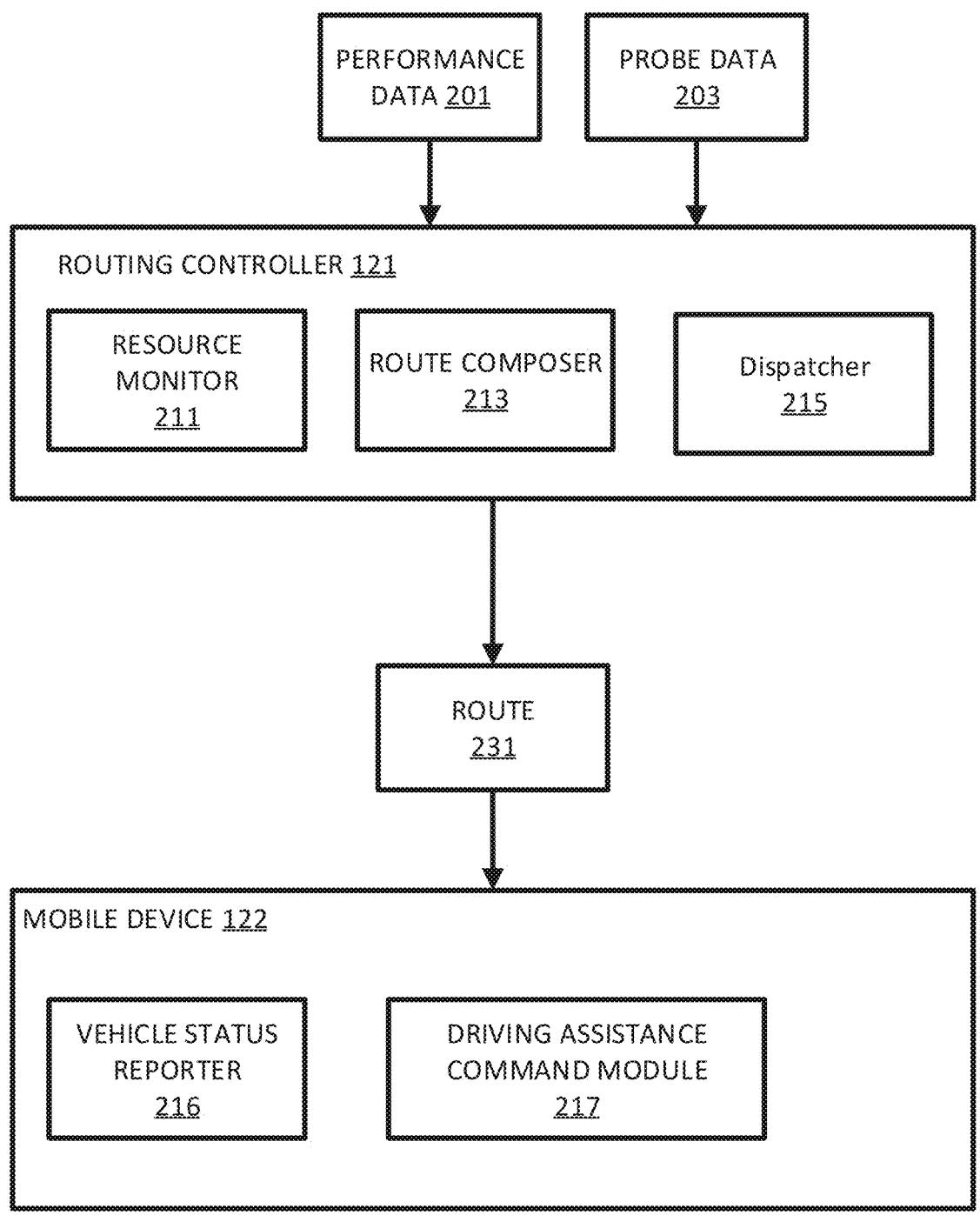
FIG. 2 illustrates a routing controller for the system of FIG. 1.

FIG. 2 illustrates an embodiment of a routing controller 121 for the system of FIG. 1. While FIG. 1 illustrates the routing controller 121 at server 125, the mobile device 122 may also implement the routing controller 121. In some cases, elements of the routing controller 121 may be shared or divided between the server 125 and the mobile device 122. In some other cases, elements of the mobile device, such as the vehicle status reporter 216 and/or driving assistance command module 217 may be shared or divided between the server 125 and the mobile device 122. Additional, different, or fewer components may be included.

The routing controller 121 may include a resource monitor 211, a route composer 213, and a dispatcher 215. Other computer architecture arrangements for the routing controller 121 may be used. The routing controller 121 receives data from one or more sources. The data sources may include network performance data 201 and mobile device probe data 203, but additional data sources are discussed in other embodiments. The network performance data includes information about the wireless network 127 that the mobile device 122 is connected to. The network performance data 201 may include data about (or measurements of) speed, bandwidth, or network generation/type.

The network performance data 201 may be aggregated from multiple mobile devices 122. The network performance data 201 may be aggregated across a particular service, platform, and application. For example, multiple mobile devices 122 may be in communication with a platform server associated with a particular entity. For example, a map provider may collect network performance data 201 using an application (e.g., navigation application, mapping application running) running on the mobile device 122.

The network performance data 201 may be collected automatically. For example, the mobile device 122 may be part of, integrated with, or in communication with a vehicle, as discussed in more detail below. The network performance data 201 may be collected and received for the purpose of determining a previous, present, or future state of wireless network performance of an area (e.g. for one or more roads or paths). As the vehicle travels along roadways, the communications interface 102 collects the network performance data 201. The network performance data may include a measure of available bandwidth for a mobile device 122.

The probe data 203 may include any type of position information and may be determined by the mobile device 122 and stored by the mobile device 122. In some cases, the probe data 203 may be collected or received in response to collection of the network performance data 201. For example, when the network performance data 203 is measured or collected, probe data associated with the network performance data 203 may also be collected or measured. In other cases, the probe data 203 may be collected or received separately or independently from the network performance data. For example, the probe data 203 may be collected periodically or at a first interval, while the network performance data 201 is collected at a different interval or at other times. The probe data 203 may include geographic coordinates, a heading, and/or a speed.

In some cases, the probe data may include a current set of driving assistance features enabled, or the occurrence a switchover from one set of features to another.

The probe data 203 and the network performance data 201 may be combined. For example, one measurement or piece of data of network performance 210 may be annotated with probe data 203. The mobile device 122 may be configured to generate combined data using the probe data 203 collected by the probe 101 and the network performance data 201 collected by the communications interface 102.

The probe data 203 and the network performance data 201 may be collected at a particular frequency. Examples for the particular frequency may be 1 sample per second (1 Hz) or greater (more frequent). The sampling frequency for either the probe data 203 and the network performance data 201 may be selected based on the sampling frequency available for the other of the probe data 203 and the network performance data 201. The routing controller 121 is configured to down-sample (e.g., omit samples or average samples) in order to equalize the sampling frequency of the probe data 203 with the sampling frequency of the network performance data 201, or vice versa. In some cases, the frequency that the probe data 203 and the network performance data 201 are collected may vary. For example, the rate at which the probe data 203 is received may vary based on a trajectory or dynamic behavior of the mobile device 122 (e.g. whether the mobile device 122 is travelling at one speed or accelerating/decelerating), a complexity of a path travelled by the mobile device 122 currently or in the future (e.g. whether the mobile device 122 is approaching an intersection, off ramp, roundabout), or traffic conditions (e.g. accumulation or dissipation of traffic congestion).

The resource monitor 211 is configured to receive the wireless network performance data 201 and the probe data 203. The resource monitor may receive the data 201, 203 from one or more mobile devices 122. In some cases, the wireless network performance data 201 may be associated with one or more path segments. For example, the wireless performance data may include wireless performance information for all or part of a particular road, highway, etc. In some other cases, the wireless network performance data 201 may not have any association with one or more path segments. The resource monitor 211 may be configured to match or associate all or a portion of the wireless network performance data with one or more path segments. In one example, the resource monitor may associate the wireless network performance data with a path segment based on the probe data 203. A mobile device 122 may collect the wireless performance data 201 and probe data 203 indicating a location of the mobile device 122. The resource monitor 211 may use the probe data 203 to find a path segment that matches the location in the probe data 203 and associate the wireless network performance data 201 with the path segment.

The route composer 213 may be configured to determine a score for one or more path segments. The score may reflect the wireless performance for the path segment. For example, a higher score may reflect a higher level of wireless network performance (e.g. speed, bandwidth, latency) available to a mobile device 122 traversing the path segment.

In one example, path segments may be given a score based on network performance (e.g. coverage, speed, bandwidth, latency) for the segment. For example, a numerical score may be based on ranges of speed available for the path segment. Speeds above 200 Mbit/s may be scored as a 5, speeds in the range of 200-150 Mbit/s may be scored a 4, speeds of 150-100 Mbit/s may be scored a 3, speeds of 100-50 Mbit/s may be scored a 2, speeds of below 50 Mbit/s may be scored a 1, and where wireless performance data including speed is unknown or unavailable, a score of 1 may be given. Other ranges for speed or other performance data may be used, and different scores may be given. For example, decimal scores may be used. Instead of ranges, a factor may be applied to the wireless performance data to determine the score. In one case, the speed may be divided by a factor of 100, so that a wireless network with a speed of 150 Mbit/s on a path segment is scored as 1.5.

In another example, path segments may be scored based on a type, standard, or technology of wireless network available over the path segment, as indicated in the wireless performance data. Path segments with 5G network coverage may be given a score of 5, path segments with 4G network coverage may be given a score of 4, path segments with 3G network coverage may be given a score of 3, and so on, while path segments without any wireless network coverage may be given a score of 0.

In some cases, a route score may be based on a combination of wireless network performance data. For instance, the score may be based speed, bandwidth, latency, and/or signal strength. In a further example, a path segment may receive scores for each of multiple wireless network performance data, such as a first score for bandwidth, a second score for speed, a third score for latency, and a fourth score for signal strength. The multiple scores may be combined for a path segment. In one case, the scores may be averaged. In another case, a weighted combination of the scores may be used. For example, bandwidth may be of particular performance to enable driving assistance features, so the bandwidth score for the path segment may be given greater weight (e.g. the score may be multiplied by a factor equal to or less than one, and greater than the quotient of 1 divided by the number of different wireless performance scores for the path segment). Where a path segment has a bandwidth score of 5 (out of 5 possible), a speed score of 4, and a latency score of 3, for example, the bandwidth score may be weighted more heavily by multiplying by a factor of 0.5, and the speed score and latency scores may be multiplied by a factor of 0.25 (e.g. weighing these factors less), for an overall score of 4.25 for the path segment. Other weighting factors may be used.

Each set or level of driver assistance features may have a network performance threshold to enable the features. For example, fully autonomous driving (e.g. SAE level 5) may require a 5G wireless connection with a minimum download/upload speed, bandwidth, and/or latency. If the wireless performance data 201 meets or exceeds the required performance, the driver assistance features may be enabled. Different sets or levels of driver assistance features may have different requirements.

The route composer 213 may score the path segments based on whether or not the wireless performance data 201 for the segment meets or exceeds a driver assistance threshold. In some cases, the path segment may be scored based on the highest or more sophisticated set or level of driver assistance features enabled by the wireless network performance data 201. For example, where autonomous driver assistance features require a 5G connection, path segments may be scored based on whether or not (or to what extent) a 5G network is available as indicated by the wireless network performance data 201 for the path segments. In another example a "hands-off" set of driver assistance features may require a 4G connection or above to be enabled. Path segments having 4G or 5G network coverage may be scored as enabling the "hands-off" driver assistance features because those networks meet or exceed the required threshold of network performance. Though examples are given using network standards as the requirement for driver assistance features, the requirements may specify a minimum or minimum bandwidth, speed, latency, or signal strength required to enable the driver assistance features.

As indicated in the wireless performance data 201 associated with a path segment, multiple network types or speeds may cover one path segment. The path segment may be scored using the highest performing (e.g. strongest signal, fastest, highest bandwidth, least latency) wireless network available over the segment. For example, where both 3G and 5G networks are available for all or nearly all of the length of a path segment, the path segment may be scored based on the 5G network (e.g. given a score of 5). In some cases, one or more networks available for a path segment and/or may cover less than all the length or extent of a path segment. For example, when a 5G network covers half of a path segment, and a 3G network covers another half of the same path segment, the path may be given a score based on the lesser 3G network (e.g. given a 3). Because high speed networks such as 5G enable many advanced driver assistance features, scoring the path segments lower when there is only partial 5G coverage may avoid "changeovers" from one set of driver assistance features to another set (e.g. changing from autonomous driving to a hands-off driver assistance level when 5G coverage runs out).

The score may be an initial score or a static score for the path segment. For example, the route composer 213 may be configured to re-score or update the score of the path segments. For example, additional wireless performance data 201 may be received. The path segments may be re-scored based on the additional data. Other scoring schemes and values may be used.

The route composer 213 may be configured to generate a route 231. The route may provide navigation for a mobile device 122 or vehicle. The route composer 213 may determine the vehicle route based on the scores of the path segments. For example, the route composer 213 may generate a route containing path segments enabling at least a minimum set of driver assistance features. The route may contain path segments with wireless network performance data that enable autonomous driving features along the route. In some cases, the route that enables the driving assistance features may be different from a fastest route or a shortest route to a destination as the fastest route or shortest route may enable a lower level or less sophisticated set of driver assistance features. In some other cases, the wireless network performance data (and the driver assistance features enabled by the wireless performance) may be balanced with parameters such as trip speed and distance to determine the route.

The routing controller 121, or the dispatcher 215, may output a route 231. The route 231 may be output to a mobile device 122, for example. The dispatcher 215 may output the route 231 to the mobile device 122 via the network 127. In some cases, the dispatcher 215 may output the route 231 in response to the routing controller 121 receiving a routing request. In some other cases, the route 231 is output periodically or in response to another event. For example, when new or updated wireless performance data 201 is received, an updated route 231 based on the updated data 201 may be output.

The vehicle status reporter 216 may be configured to send vehicle probe data from the mobile device 122. The probe data may include a driving assistance data requirement, a plurality of available driving assistance capabilities, an active driving assistance capability of the one or more driving assistance capabilities, a driving assistance data requirement for the one or more driving assistance capabilities, and/or a wireless network performance data of a wireless network covering the vehicle. The reporter 216 may be configured to send probe data multiple times, for example, as new probe measurements are available or on a periodic basis.

The driving assistance command module 217 may be configured to receive navigation commands from a server 125 or the routing controller 121. For example, a navigation command may include instructions to switch from a current or active set of driving assistance features to another set of driving assistance features. In some cases, the navigation command includes instructions to switch driver assistance features while traveling on, or prior to traversing, a path segment. The navigation commands may be received when wireless network performance data for a path segment indicates that data requirements for sets of driving assistance features are enabled or disabled. For example, the navigation command may switch to or from (e.g. enable or disable) an autonomous driving feature (e.g. driver-less input capabilities) for a path segment.

Figure 3:
FIG. 3 depicts wireless network performance data.

FIG. 3 depicts wireless network performance data. Though the wireless performance data is overlaid on a map 300 in FIG. 3 containing path segments, the data may, in some cases be unassociated with a particular path segment or may not be presented in a visual manner. For example, the wireless network performance data may include a measurement of wireless network performance (e.g. bandwidth, speed, latency, signal strength) associated with probe data, but not matched to a path segment.

In FIG. 3, path segments for surface streets and highways are shown. Overlaid on the path segments are different wireless performance data. A 5G network 302 is present, 4G LTE network, and a lack of wireless network coverage (or unknown wireless performance data) 306 is indicated. Certain path segments, such as major or heavily trafficked roads, may have long portions with uninterrupted 5G coverage 302 that enable autonomous driver assistance features. Certain other segments, such as highways (e.g. "90" and "US-41"), have significant portions without 5G coverage 302. While a route from "Streeterville" to the "Loop" along the highway may cover the shortest distance or least amount of time (depending on traffic), the route may have several changeovers between autonomous driving assistance and another set of driving assistance features because of the change in network performance along the route (e.g. due to inconsistent 5G coverage 302 along the route). Instead, a route planned entirely though path segments with 5G coverage 302 (e.g. along "Wells St." or "LaSalle St.," running north to south) may enable autonomous driving along the entire route, at the expense of a longer route or more travel time.

Figure 4:
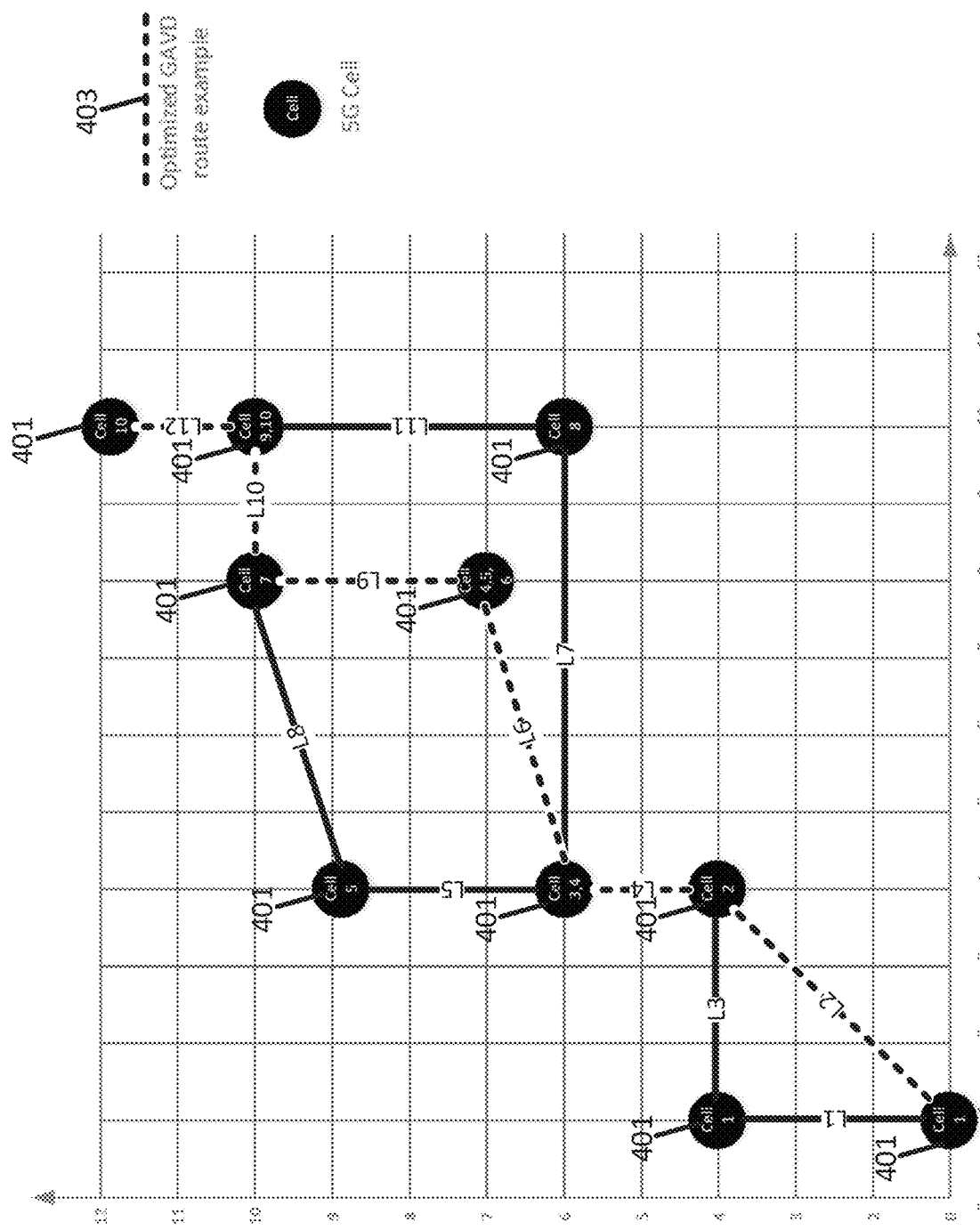
FIG. 4 illustrates route planning with the system of FIG. 1.

FIG. 4 illustrates route planning. Nodes 401 are connected by path segments L1-L12. Though in FIG. 4 wireless network "cells" or access points are located on the nodes 401 between path segments, the wireless network cells may be located along path segments or away from nodes. An example route 403 including path segments L2, L4, L6, L9, L10, and L12 is shown with a dashed line. The nodes and path segments are overlaid on a grid pattern. Coordinates in the grid pattern may be used to refer to particular path segments and/or nodes.

The path segments L1-L12 may be whole or parts of surface streets, highways, sidewalks, bike paths, trails, or other paths. The nodes 401 may indicate locations along a path, e.g. between two segments of the same path, or locations where multiple paths adjoin, such as at intersections.

Different methods may be used to plan which path segments L1-L12 to include in a route 403. For example, Dijkstra's algorithm, A* algorithm, Dynamic Programming algorithm, Bellman-Ford algorithm, and others may be used to plan the route.

In one example according to Dijkstra's algorithm, planning a route may start at a start node. For example, the node 401 with cell 1 may be the start node. The other nodes 401 may be marked as unvisited and included in an unvisited set of nodes 401.

A tentative value or score may be assigned to each node. The start node may be set to 0. Other nodes may be set to negative infinity or null, indicating that the nodes are unscored.

The route planning process may iteratively consider all neighboring nodes to a current node. At the beginning, the start node is also the current node. A score for the nodes neighboring the current node may be determined. For example, the score of the neighboring nodes may be determined based on the wireless network performance for the path segment connecting the current node to the neighboring nodes. In the example of FIG. 4, the path segment L1 connects the current node at (1,0) to a neighboring node at (1,4). The score for the neighboring node may be set based on the wireless performance data for the segment L2. Similarly, a neighboring node at (4,4) is connected to the current node by path segment L2 and may be scored based on the wireless performance data for the segment L2.

If a neighboring node is unscored (e.g. has a value of null or negative infinity), the node may be given a tentative value. The tentative value may be a sum of the value of the current node, plus the score of the path segment connecting the current node to the neighboring node. In the starting case, the current node is the starting node and has a value of 0. In an example, path segment L1 may have a score of 3, so the tentative value of the node at (1,4) is 0+3=3. In another example, path segment L2 may have a score of 5, so the node at (4,4) may have a tentative value of 5. Where a neighboring node already has a tentative score, an updated score may replace the tentative score if the tentative score is less than the updated score. Otherwise, the tentative score may be kept.

The scoring may continue for all unvisited neighboring nodes of the current node. Once all unvisited neighboring nodes have been scored, the current node may be marked as visited and removed from the set of unvisited nodes. A visited node is not checked or scored again.

The scoring process continues unless an exit condition occurs. In some cases, the process may stop when a destination node has been marked as visited. In another case, the process may stop when the highest value of a node in the unvisited set is null or negative infinity. If an exit condition has not occurred, the neighboring node with the highest score is selected as the new current node, and the scoring process may continue for the new unvisited nodes of the new current node. In the example, because the node at (4,4) had a score of 5, and the node at (1,4) had a score of 3, the new current node would be the node at (4,4).

Once an exit condition has occurred, a route may be planned by including in the route the previous path segments between nodes with the highest score. If multiple of such routes exist (e.g. if the sum of the score of path segments included in two different routes are the same), other criteria may be used to select the route. For example, a drive time or driving distance for each route may be determined and the route having the least driving time or shortest distance travelled may be selected.

In some cases, the path segments may be scored separately for the criteria of wireless performance, driving time, and distance, and multiple routes determined based on the multiple scores. Additionally or alternatively, the score for each segment may be a combination of the criteria. A user preference may be received specifying an order of importance for wireless network performance (or a set of driving assistance features enabled thereby), driving distance, congestion, and/or driving time. For example, the path segments may be scored separately for the criteria, and a combined score for each route may be determined based on a combination of the scores. Based on the user preference, the scores for each individual criterion may be weighted and summed. For example, where the user preference places a higher importance on wireless performance over drive time or distance, the score for wireless performance may be multiplied by a higher weighting factor than the weighting factor applied to the drive time and distance scores. If no preference is received, for example, the individual criteria scores may be averaged. A tradeoff between wireless performance (and the driving assistance features enabled thereby) and other factors, such as travel time and distance, may be determined. Based on the scores for the path segments, different routes may be generated that have, for example, a highest wireless network performance score (e.g. enabling a highest level of driving assistance features), a lowest distance score (e.g. having the shortest distance), the lowest travel time score (e.g. having the least travel time), or a best combined score (e.g. combination of wireless performance score, distance score, and travel time score).

For example, based on a user preference (e.g. sent by a mobile device 122 to the server 125), a route with poorer wireless network performance (enabling a lesser set of driving assistance features on the route), but a shorter travel time or distance, may be chosen or sent to the mobile device 122 instead of a route with better wireless performance (enabling a greater set of driving assistance features), but a longer travel time or distance. In some cases, both routes may be sent to the mobile device, e.g. for a user to choose a preferred route. The user preference may express a tradeoff threshold. The threshold may express a numerical or percentage difference between two routes that is an acceptable tradeoff. For example, a first route is 8 miles long and enables autonomous driving features, while a second route is 5 miles long and enables eyes-off driving assistance features. The user preference may specify that a route may be chosen when a decrease in driving distance (e.g. specifying a threshold numerical difference in driving distance) accompanies a small decrease in the set of enabled driving assistance features. If the user preference includes a threshold of at least 3 miles decrease in driving distance accompanying a small reduction in enabled driving assistance features (or a minimum set of enabled driving assistance features), for example, the second route may be chosen and output to the mobile device instead of the first route.

In another example a second route is 20% faster than a first route but enables a smaller set of driving assistance features. The user preference may specify that a route may be chosen when a decrease in driving time (e.g. specifying a threshold percent difference in driving distance) accompanies a small decrease in the set of enabled driving assistance features. If the user preference includes a threshold of at least a 20% decrease in driving distance accompanying a small reduction in enabled driving assistance features (or a minimum set of enabled driving assistance features), for example, the second route may be chosen and output to the mobile device instead of the first route.

Where the path segments and, thereby, the nodes are scored according to wireless performance data, the route may be examined to determine whether a particular set of driving assistance features are enabled along the route. For example, autonomous driver assistance features may be enabled by a connection to a 5G network. Where wireless performance data for a path segment meets or exceeds this threshold, the path segment may be scored as a 5. For a given route, the autonomous driving features are enabled if the number of path segments included in the route multiplied by 5 equals the sum of the path segment scores in the route.

Figure 5:
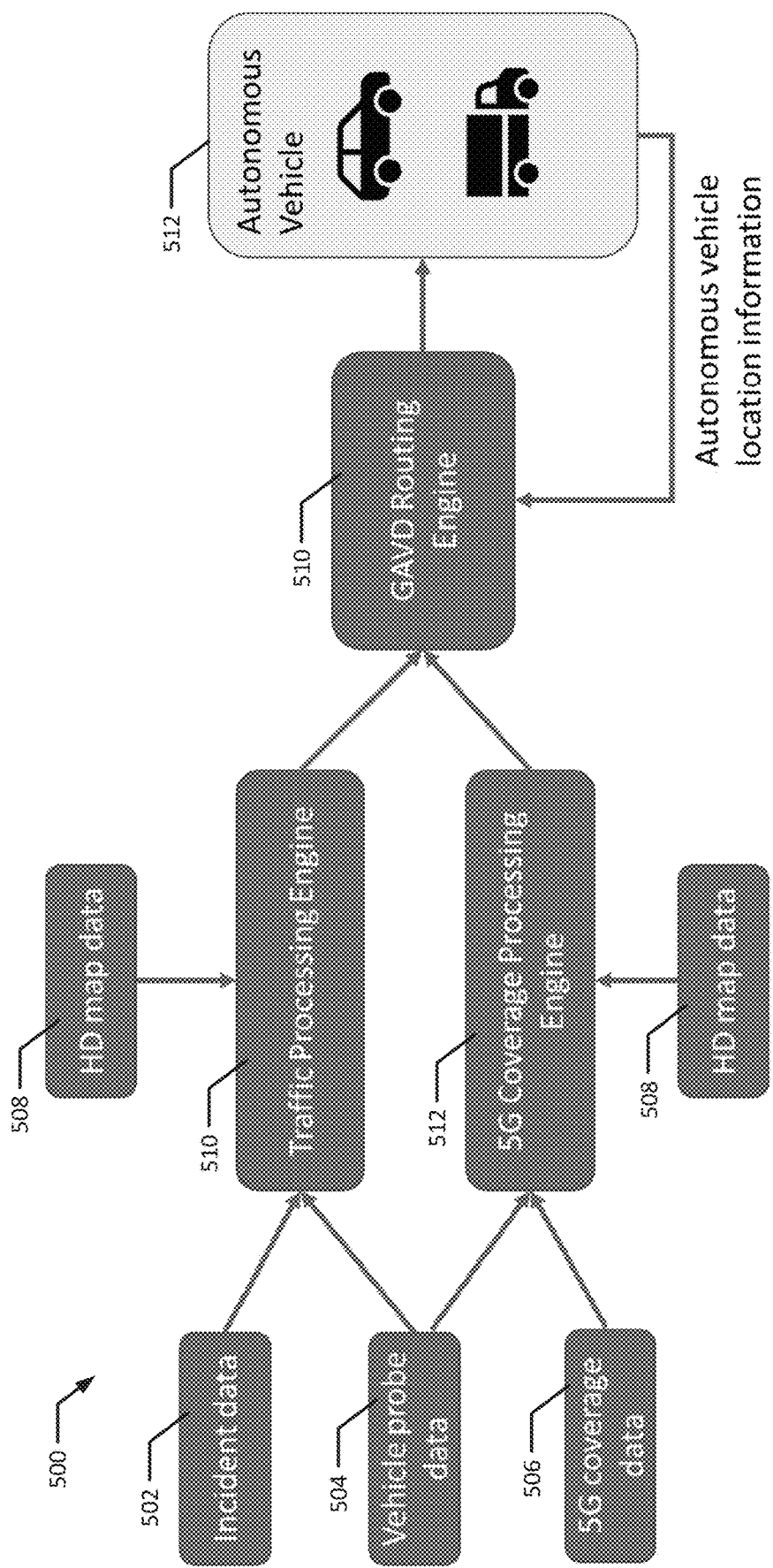
FIG. 5 illustrates a second embodiment of a system for route planning.

FIG. 5 illustrates a system 500 for route planning. As discussed above, probe data and wireless network performance data, such as 5G coverage data, may be used to score path segments. In some cases, wireless network performance scoring (based on wireless performance data, such as 5G coverage data 506) may be performed (e.g. by the wireless network performance processing engine 512) in addition to scoring based on traffic data (e.g. by the traffic processing engine 510), such as incident data 502, and vehicle probe data 504. In this way, a route planning system (e.g. the GAVD routing engine 510) may plan a route based on both wireless performance data 506 and traffic data 502.

The incident data 502, vehicle probe data 504, and wireless performance data 506 may be updated. The updates may allow for dynamic route planning based on current conditions. In one example, a traffic jam happens on a busy road due to an accident. The accident and traffic jam on the road may be included in the incident data. Additionally, probe data 504 from vehicles 512 (e.g. autonomous vehicles or non-autonomous vehicles) in the traffic jam may be collected. The probe data 504, for example, may indicate the extent of congestion (e.g. if probe data indicates many slow-moving vehicles close together). The wireless performance data 506 for the road may also be collected. In some cases, the incident data 502, probe data 504, and wireless performance data 506 may be matched to the road segment (e.g. included in the HD map data 508) based on, for example, coordinates in the probe data 504. While, in normal traffic, wireless performance on the road may enable autonomous driving assistance features, the wireless performance may degrade with a large number of vehicles on the road. By collecting the various sources of information, route planning to enable a level or set of driver assistance features may avoid heavy traffic and/or atypical wireless performance caused by the traffic jam or another event. Additionally, the route may be updated based on a position of the vehicle 512 that requested the vehicle route.

Figure 6:
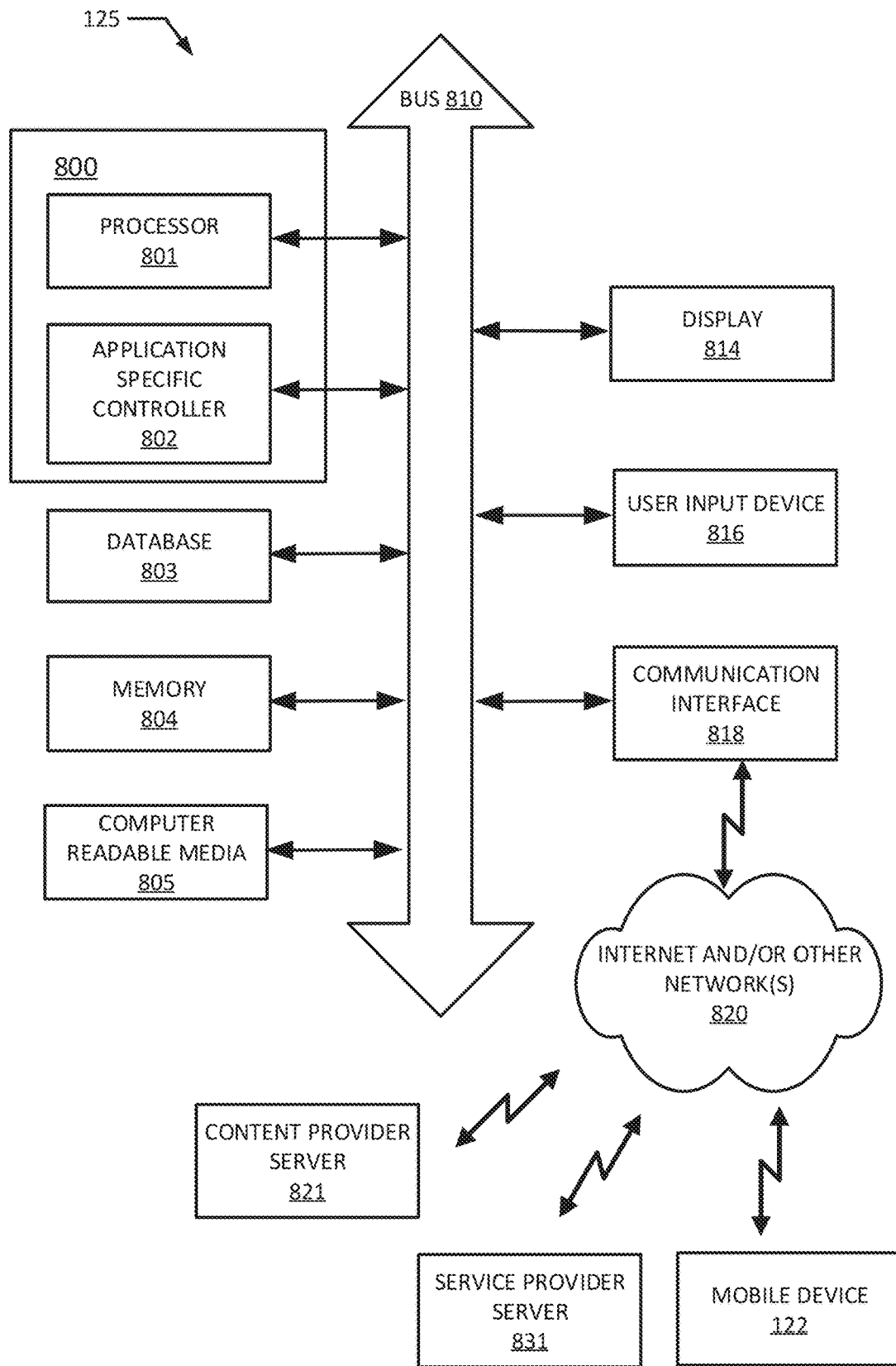
FIG. 6 illustrates an example server for the system of FIG. 1.

FIG. 6 illustrates an example server 125 for the system of FIG. 1. The server 125 may include a bus 810 that facilitates communication between a controller (e.g., the routing controller 121) that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database 903 of the mobile device 122. Additional, different, or fewer components may be included.

The memory 804 and/or the computer readable medium 805 may include a set of instructions that can be executed to cause the server 125 to perform any one or more of the methods or computer-based functions disclosed herein. In a networked deployment, the system of FIG. 6 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 820 with a content provider server 821 and/or a service provider server 831. The server 125 may provide the point cloud to the content provider server 821 and/or the service provider server 831. The content provider may include device manufacturers that provide location-based services associated with different locations POIs that users may access.

Figure 7:
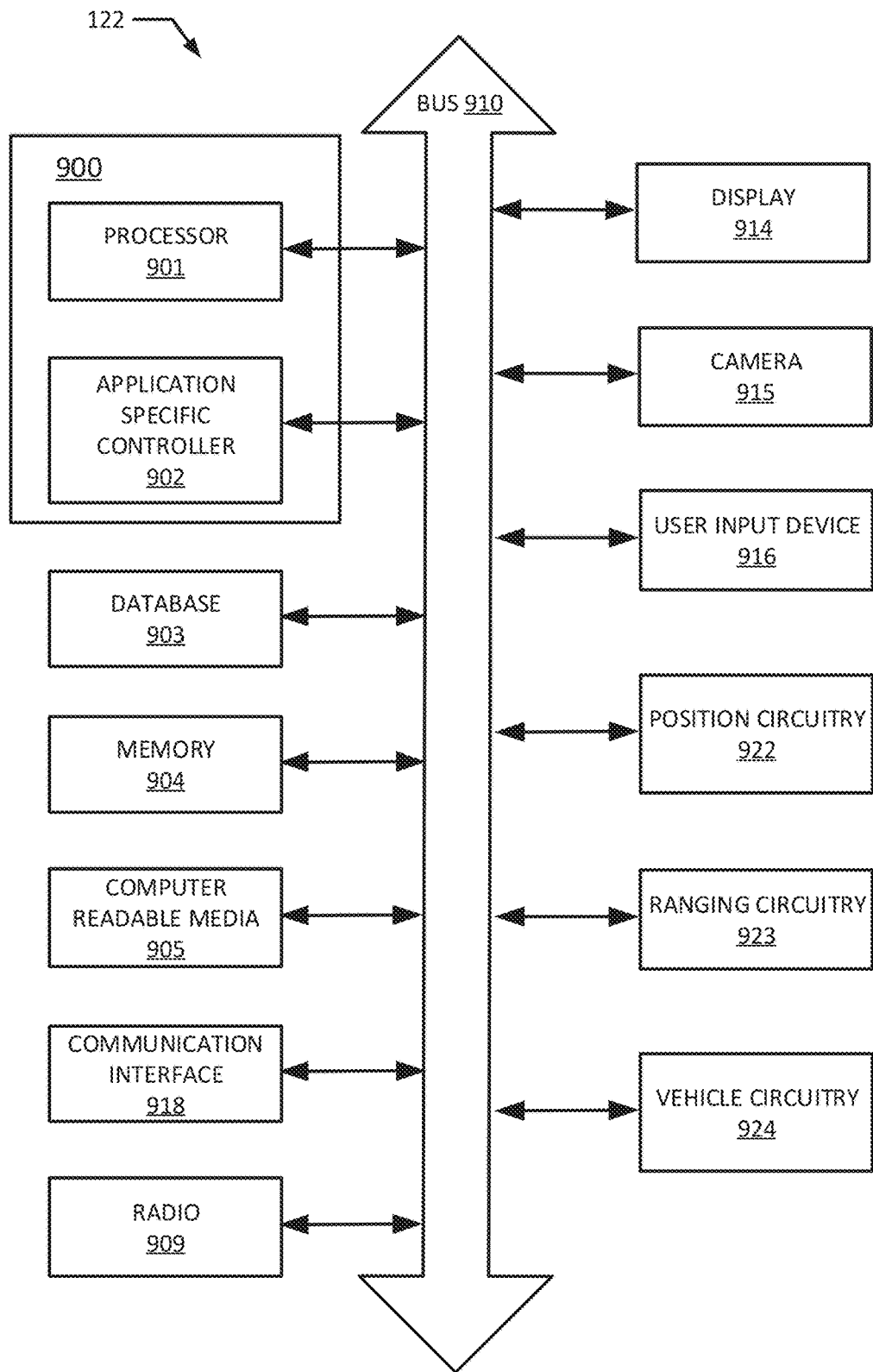
FIG. 7 illustrates an example mobile device for the system of FIG. 1.

FIG. 7 illustrates an example mobile device 122 for the system of FIG. 1. The mobile device 122 may include a bus 910 that facilitates communication between a controller (e.g., the routing controller 121) that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to database 123. The device-side database 903 may be a user database that receives data in portions from the database 903 of the mobile device 122. The communication interface 918 connected to the internet and/or other networks (e.g., network 820 shown in FIG. 6). The vehicle circuitry 924 may include any of the circuitry and/or devices described with respect to FIG. 7. Additional, different, or fewer components may be included.

Figure 8:
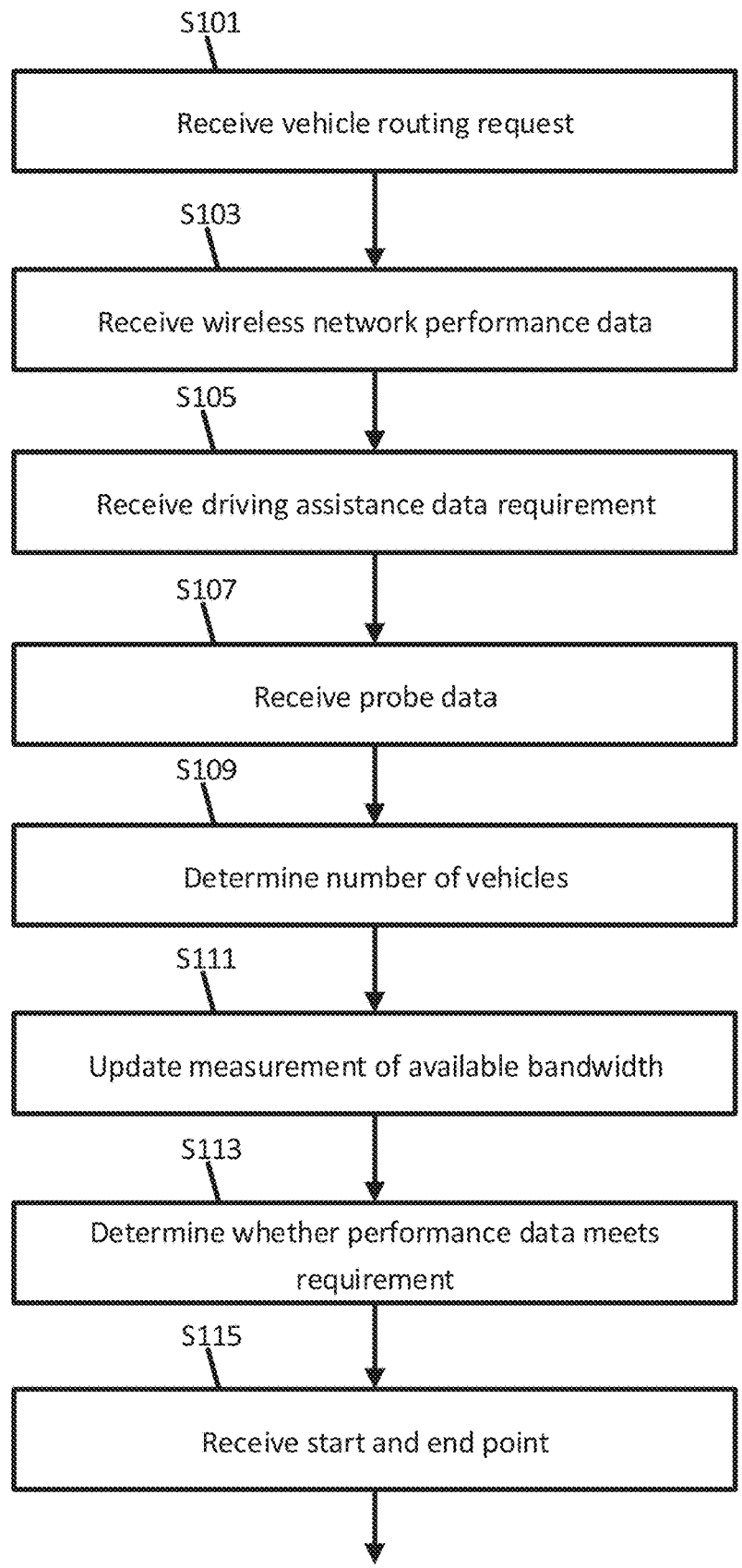
FIGS. 8 and 9 illustrate an example flow chart for the server of FIG. 6.
Figure 9:
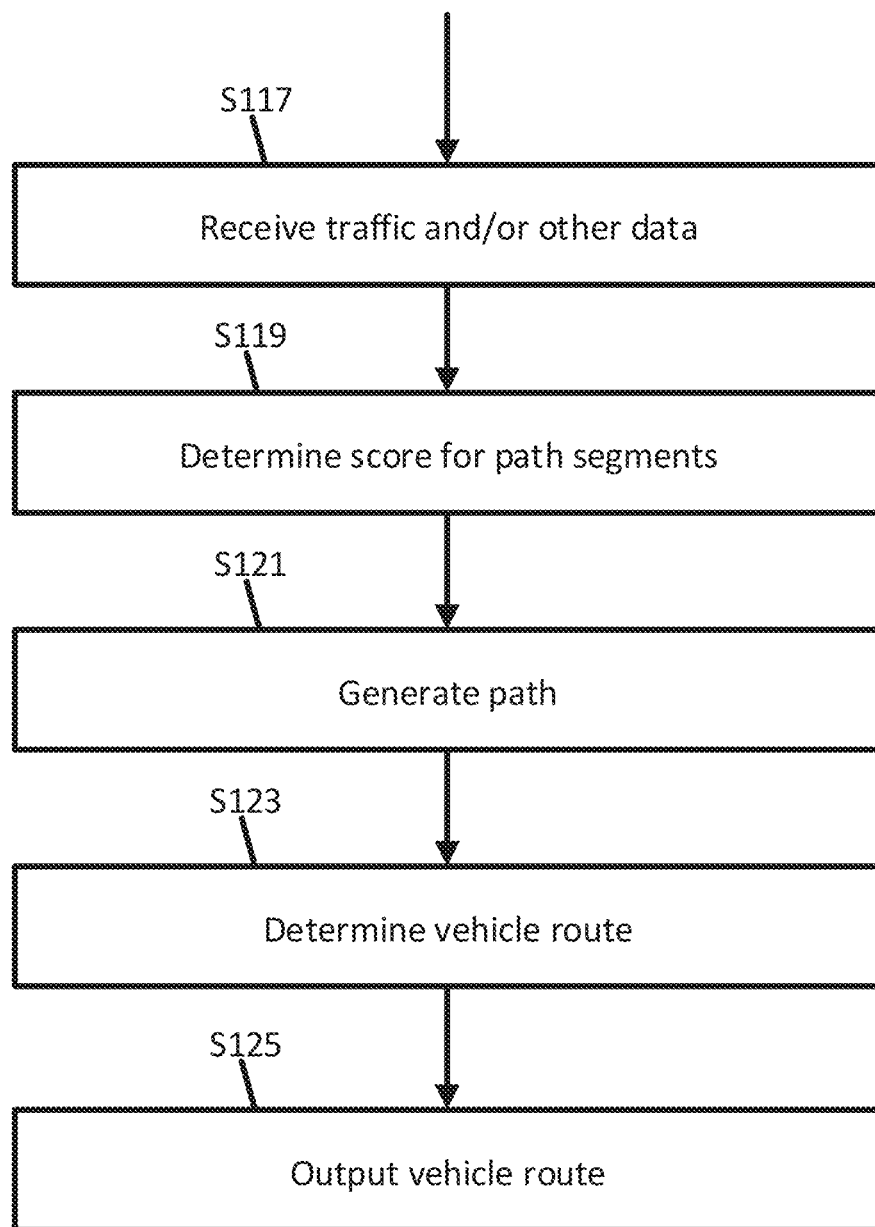

FIGS. 8 and 9 illustrate an example flow chart for the server of FIG. 6. FIG. 9 is a continuation of the flow chart of FIG. 8. Additional, different, or fewer acts may be included. For example, act S101 may be omitted. The acts may be performed in a different order than shown. For example, act S101 may proceed from act S103.

At act S101, the controller 800 receives a vehicle routing request. The routing request may be received, for example, via the communication interface 818. The vehicle routing request may be generated by a mobile device 122. In some cases, the vehicle routing request may include a driving assistance capability of a vehicle. The driving assistance capability may indicate which set or level driving assistance features are available on the vehicle. In addition to the capability, the routing request may include a data requirement to enable the driver assistance capability. For example, the data requirement may specify a threshold level of wireless network performance, such as speed, bandwidth, signal strength, or latency, to enable the driver assistance capability. When the wireless network performance is below the threshold, the driving assistance capability may be disabled.

At act S103, the controller 800 receives wireless network performance data. The wireless network performance data may indicate wireless network performance for one or more path segments. Performance of one or more wireless networks (e.g. operated by different providers/operators, or using different standards) may be included in the data. In some cases, the performance data may be generated by one or more mobile devices. For example, the performance data may be generated by the mobile device that generated the routing request, and/or by one or more other mobile devices. In some other cases, the wireless network performance data may be received from an operator of the wireless network.

The wireless network performance data may include a measurement of available bandwidth, signal strength, speed, or latency. For example, the mobile device 122 may measure or record the bandwidth, signal strength, speed, or latency available over the connection between the mobile device and the wireless network.

At act S105, the controller 800 receives a driving assistance data requirement. As discussed above, the data requirement may specify a threshold level of wireless network performance, such as speed, bandwidth, signal strength, or latency, to enable the driver assistance capability. When the wireless network performance is below the threshold, the driving assistance capability may be disabled.

At act S107, the controller 800 receives probe data. The probe data may include a geographic location such as a longitude value and a latitude value. In addition, the probe data may include a height or altitude. In some cases, the probe data may include a wireless network usage of the one or more vehicles. The probe data may be collected over time and include timestamps. The probe data may be unique to each vehicle or mobile device generating the probe data. Based on the number of unique mobile devices or vehicles generating the probe data, a number of vehicles on a path segment may be determined. For example, from a set of probe data, locations in the probe data may be used to match the mobile device or vehicle that generated the probe data to a particular road segment. A number of vehicles on a path segment may be estimated or determined based on the number. The number of vehicles on a path segment may be used, for example, to estimate traffic congestion or estimate or modify the wireless network performance data. If a number of vehicles on a path increases, an estimated reduction in wireless network may be estimated or predicted.

At act S109, the controller 800 updates the measure of available bandwidth in the wireless network performance data. The wireless network performance may vary over time. For example, as the number of mobile devices connected to a wireless access point or "cell" varies, the bandwidth available to each device may vary.

At act S111, the controller 800 updates the measurement of available bandwidth. As new probe, traffic, or wireless network performance data is received, the measure of available bandwidth may be updated. When available bandwidth for a path segment drops below a threshold amount of bandwidth to enable driver assistance features, new vehicle routes may avoid the path segment, or existing vehicle routes may be updated based on the new data. In some cases, the measurement of available bandwidth may be updated based on the wireless network usage of one or more vehicles or mobile devices.

At act S113, the controller 800 determines whether the wireless network performance data meets or exceeds the driving assistance data requirement. The controller 800 may compare the performance data for a path segment to the data requirement to determine which, if any, driving assistance features may be enabled on the path segment.

At act S115, the controller 800 receives a start and end point of a route. In some cases, the start point and end point may be included as part of the vehicle routing request. The start point and end point may define a desired starting and end location for the route. In some cases, only an end point may be received. The start point may be determined based on a location reported by the mobile device, e.g. received by the controller 800 in the probe data.

At act S117, the controller 800 receives traffic data or other data. For example, data describing traffic, speed, distance, weather, functional classification, elevation, curvature, grade, number of accidents, traffic lights, lane size, or a combination thereof for the one or more path segments. As discussed above, traffic information may be used in addition to the wireless performance data for planning the route.

At act S119, the controller 800 determines a score for path segments. The score may be based on the wireless performance data for the path segment. For example, the path segments may be scored on the available bandwidth, latency, speed, or signal strength of one or more wireless networks on the path segment. Additionally or alternatively, the path segment may be scored based on a level or set (e.g. a highest or most sophisticated level or set) of driving assistance features enabled by the wireless performance data for the path segment. In one example, a path segment is scored a 5 out of 5 if a 5G network is available for substantially all of the path segment. In another example, a path segment is scored a 5 out of 5 if autonomous driving is enabled on the path segment or if the wireless performance on the path segment exceeds a threshold performance or data requirement (e.g. as determined in act S113). Where multiple driving assistance data requirements are received, the path segment may be scored based on the most advanced or sophisticated set of driver assistance features enabled by the wireless performance data for the path segment. For example, where autonomous driving requires a 5G network, and hand-off driving assistance features require a 4G network, a path segment for which a 5G network is available may be scored according to the autonomous driving features being enabled on the path segment.

As discussed above, multiple networks may be available over path segment. When a fastest or widest band network (e.g. 5G network) is available for less than all of a path segment, the path segment may be scored according to a next fastest or widest band network available (e.g. 4G, 3G or 2G) for a greater part of the path segment.

The scores may be limited to a particular time. For example, the scores may be valid at the time the routing request is received, but may expire when new wireless performance, probe, or traffic data is received or a period of time has elapsed, after which the expired scores may be updated based on the new data.

At act S121, the controller 800 generates a path. The path may be generated based on path segments leading from the start point to the end point. When there is a plurality of path segments, multiple paths with multiple combinations of path segments may be generated. One or more paths may be constructed according to the process described with respect to FIG. 4. In one example, a path may include path segments having a highest score, such as a score of 5 on a scale of 0 to 5.

At act S123, the controller 800 determines the vehicle route. The vehicle route may be determined based on the score of the path segments. For example, the vehicle route may be based on or include path segments that have scores meeting or exceeding the data requirement to enable a set of driving assistance features on the path segment.

In one example, the vehicle route may be based on the one path having the highest total score (e.g. determined by totaling the score of the path segments in the path) or having the highest average score (e.g. the total score divided by the number of path segments in the path). In some cases, multiple combinations of path segments for a route may have equally high scores. The vehicle route may be based on which combination of path segments having equal scores satisfies another aspect, such as which combination is shortest, fastest, or has less congestion compared to the other combinations of path segments.

At act S125, the controller 800 outputs the vehicle route. The vehicle route may be output to the mobile device 122. For example, the vehicle route may be output via the communication interface 818 and the network 820. In some cases, the vehicle route may include a score, wireless performance data, or enabled driving assistance features for the path segments in the route.

Figure 10:
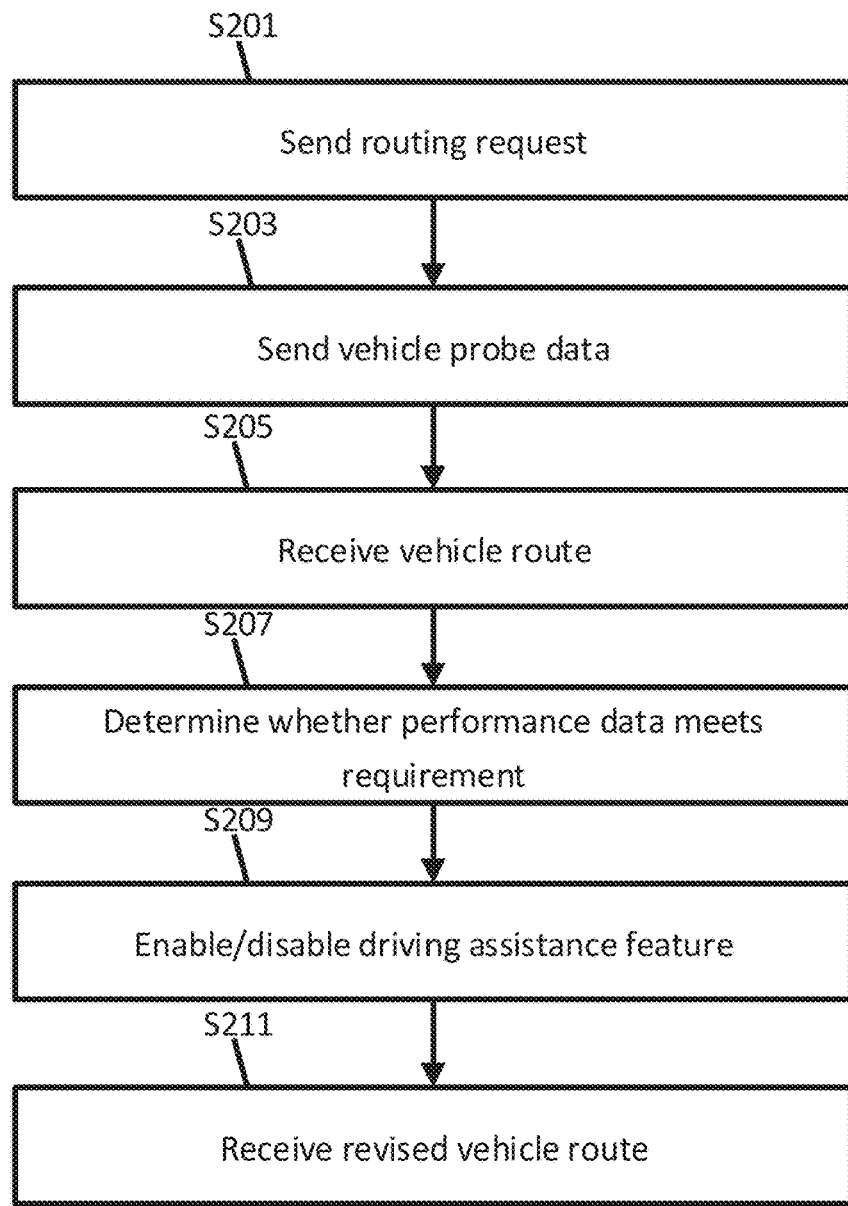
FIG. 10 illustrates an example flow chart for the mobile device of FIG. 7.

FIG. 10 illustrates an example flow chart for the mobile device of FIG. 6. Additional, different, or fewer acts may be included. For example, acts S203 and/or S207 may be omitted. The acts may be performed in a different order than shown. For example, act S201 may proceed from act S203.

In act S201, the controller 900 sends a vehicle routing request. The vehicle routing request may include a starting location and/or a destination for a route. The vehicle routing request may be sent to the server 125 of FIGS. 1 and 6.

In act S203, the controller 900 sends vehicle probe data. The probe data may include a geographic location such as a longitude value and a latitude value. The location, may be a location of the mobile device or vehicle along a route. In addition, the probe data may include a height or altitude. In some cases, the probe data may include a wireless network usage of the one or more vehicles. In some other cases, the probe data may include a speed, a driving assistance status, a wireless network connection status, or a combination thereof. The probe data may be collected over time and include timestamps. The probe data may be unique to each vehicle or mobile device generating the probe data. The probe data may be sent multiple times, for example, as the probe data is updated. In still some other cases, the probe data may include a vehicle route being traversed by the mobile device presently or in the future. Additionally or alternatively, the vehicle route may be sent separately from the probe data.

In act S205, the controller 900 receives a vehicle route. The vehicle route may be generated and sent, for example, by the server 125. The route may traverse one or more path segments. The route may be planned based on wireless performance data for path segments included in and outside of the route. Additionally or alternatively, the route may be planned based on the vehicle probe data sent, e.g. as in act S203.

In some cases, wireless network performance data may be received along with or separately from the vehicle route. For example, wireless network performance data may be received for a plurality of path segments including the path segments included in the vehicle route. Wireless performance data may be received multiple times. For example, when new or updated wireless performance data for the path segments is available, the controller 900 may receive the updated wireless performance data. In this way, changes in the wireless performance data may be used to dynamically adjust the route or driver assistance features on the path segments (e.g. in real time). In another example, updated wireless performance data may be received based on a location of the mobile device 122. For example, the controller 900 may send probe data indicating a location of the mobile device 122. When further probe data is sent with an updated location of the mobile device 122, the controller 900 may receive further wireless network performance data based on the updated location. In some cases, when the updated wireless performance data is received, the wireless performance for a path segment may change. The controller 900 may determine based on the updated wireless performance data whether to enable or disable a driver assistance feature for the path segment.

In act S207, the controller 900 determines whether the wireless performance data for a path segment meets or exceeds (or fails to meet or exceed) a driving assistance requirement. The driving assistance features or capabilities may be enabled if a data requirement is met, and may be disabled if the requirement is not met. For example, autonomous driving may have a bandwidth requirement. If the wireless performance data for a path segment indicates that wireless bandwidth is available at a level that meets or exceeds the bandwidth requirement, the autonomous driving features may be enabled on the path segment. Otherwise, another set of driving assistance features (e.g. hands-off driving) with a lower requirement may be enabled, or no driving assistance features at all may be enabled.

In act S209, the controller 900 enables or disables a driving assistance feature based on the data requirement and the wireless performance data. For example, where the controller has determined that a subsequent path segment supports a different set of driving assistance features than a current path segment, the controller 900 may switch to the different driving assistance features while traversing the subsequent path segment.

In some cases, the controller 900 may not perform acts S207 and S209. Instead, the server 125 may determine whether or not the wireless performance data for a path segment satisfies the data requirement for the driving assistance features. The controller 900 may receive a navigation command to switch from one set of driving assistance features to another set of features, or to disable driving assistance features. For example, on a first path segment, wireless performance data satisfies level 4 driving assistance features, but on a subsequent second path segment, the wireless performance data satisfies only level 1 driving assistance features. The controller 900 may receive a navigation command to switch from level 4 features to level 1 or below features prior to traversing the second path segment. Similarly, wireless performance data may enable level 3 driving assistance features on a third path segment subsequent to the second path segment. The controller 900 may receive a navigation command to switch to the level 3 driving assistance features while traversing the third path segment.

In act S211, the controller 900 receives a revised route. A route may be planned at a first time, e.g. in response to sending a routing request, but the wireless performance data for the path segments may change over time. For example, a detour may suddenly increase traffic on a path segment, thereby reducing the available wireless bandwidth and limiting the driving assistance features enabled on the path segment. Based on updated wireless performance data reflecting the change in available bandwidth (or another performance datum of the wireless performance data), the route may be adjusted or revised, e.g. to avoid path segments with low wireless performance. In another example, wireless performance may change over time or throughout the day. Rush hour traffic, for example, may reduce available bandwidth. If, while traversing the route, rush hour traffic or other congestion is present on a path segment of the route, a revised route may be received excluding or routing around the congested route, for example, to ensure enablement of the driving assistance features (e.g. which may be disabled on the congested route because of reduced wireless network performance), or to lessen the duration of the route.

In some cases, the revised route may be received in response to a change in user preference. For example, a user or driver may indicate a preference to switch from autonomous driving features to hands-off driving, or manual driving (e.g. with a minimal set of driving assistance features). In another example, a user or driver may indicate a preference for a shorter or faster route. The mobile device or controller 900 may send a request or preference data indicating the desired change from one set of driving assistance features to another set, or the new route criteria. In response to the request, the controller 900 may receive the revised route. In some cases, the revised route may include path segments that enable the desired level of driving assistance features included in the request. In some other cases, the revised route may include path segments enabling a shorter travel distance or time (potentially having a lower wireless network performance or enabling a lesser set of driving assistance features). The controller 900 may display a notification or alert that new driving assistance features are enabled or disabled on the revised route.

The user preference may specify that driving assistance features be enabled in in certain conditions. For example, the preference may indicate that autonomous driving features should be enable when traffic/congestion or a weather event (storms, rain, snow, high winds) are present. Route planning only based on traffic data or weather data may determine a revised route that has less traffic or is less affected by the weather conditions, at the expense of including in the route path segments that have reduced wireless network performance, and, therefore a lesser set of driving assistance features enabled thereon. However, the path segment experiencing congestion or a weather event conditions may be determined to have wireless network performance enabling the desired driving assistance features. As a result, the revised path may still include the path with congestion or inclement weather so long as the wireless network performance data for the path segment enabled the desired driving assistance features.

The revised route (or the original route) may include a start time or an end time for a trip. For example, the estimated time of arrival at the destination may be updated based on the revised route. In another example, the start time or end time may be based on the user preference for enablement of a set of driving assistance features on the route. For example, the controller 900 may send preference data that autonomous driving features be enabled on the route. Based on current, historical, or predicted future wireless performance data for the path segments, the route or revised route may include a start time so that the preferred autonomous driving features are enabled on the route. For example, the routing request may request a route from an office to a home. It may be determined that current wireless performance data may not support the preferred set of driver assistance features on the path segments. As a result, the routing request may recommend a delay in starting the route until wireless performance increases in the future in order to enable the driving assistance features. In another example, historical wireless performance data collected over time may indicate a reduction in wireless performance during a date and time (such as during the weekdays at 17:30, due to rush hour). The historical performance data may be used to estimate wireless performance data for path segments of the route. Based on the predicted wireless performance data for the path segments, the route or revised route may include a recommendation to start the route before or at a particular time, or after a particular time, e.g. to avoid times that path segments in the route have wireless performance that fails to enabled the preferred driving assistance features.

The revised route may include less than all of the path segments of the first route; one or more of the path segments included in the first route may be excluded from the revised route. In this way, a mobile device 122 traversing a planned route may receive an updated route responsive to changes in wireless performance data. Additionally or alternatively, the revised route may indicate that a set of driver assistance features for a path segment in the first route are newly enabled or no longer enabled by the updated wireless performance data.

Figure 11:
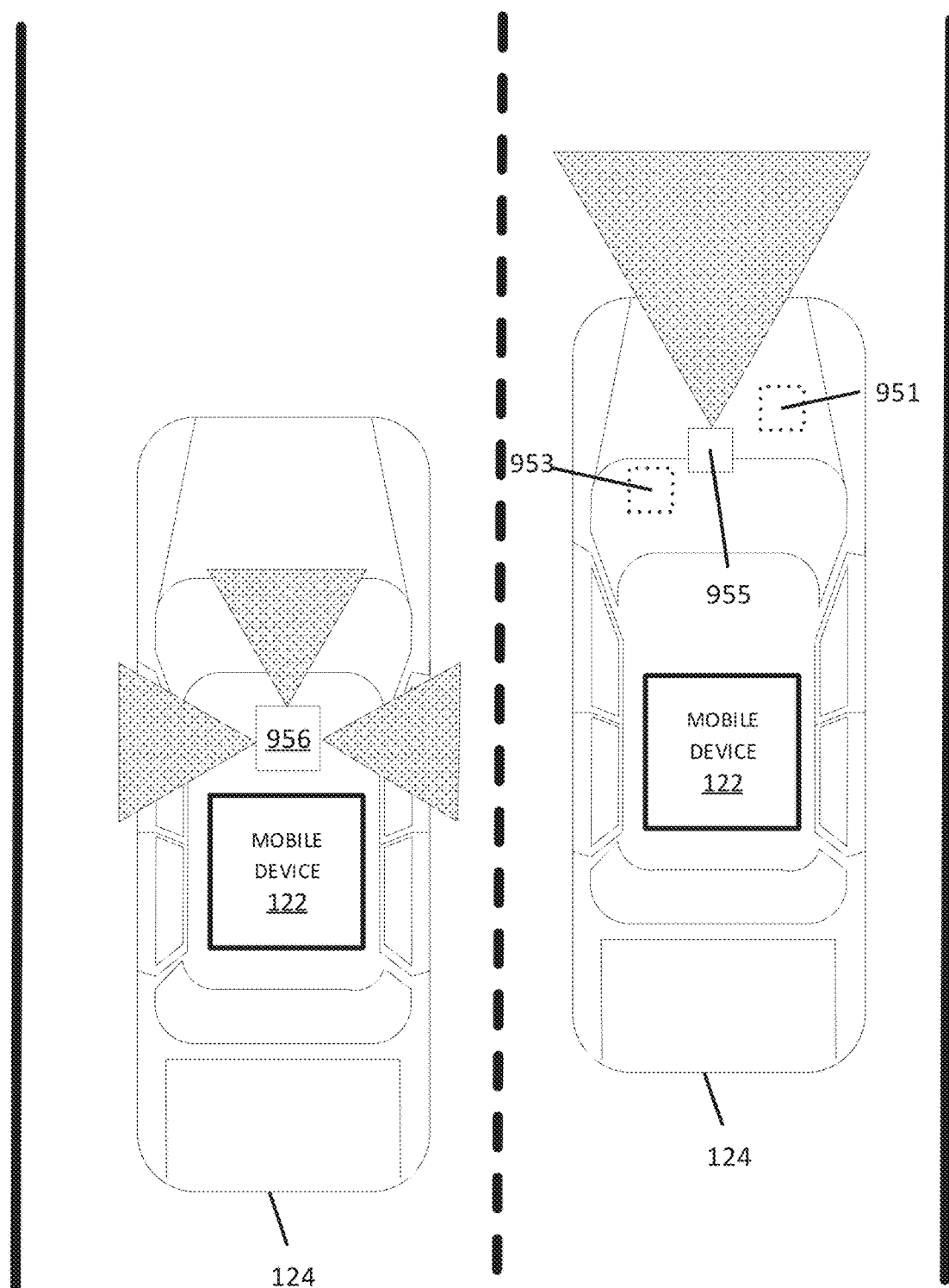
FIG. 11 illustrates an exemplary vehicle associated with the system of FIG. 1.

FIG. 11 illustrates an exemplary vehicle 124 associated with the system of FIG. 1 for providing location-based services or application using the point clouds described herein as well as collecting data for such services or applications and/or the generation of the point clouds described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a LIDAR device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LIDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to routes including path segments) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to routes including path segments received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to routes including path segments received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the routes including path segments received from geographic database 123 and the server 125 and driving commands or navigation commands.

Figure 12:
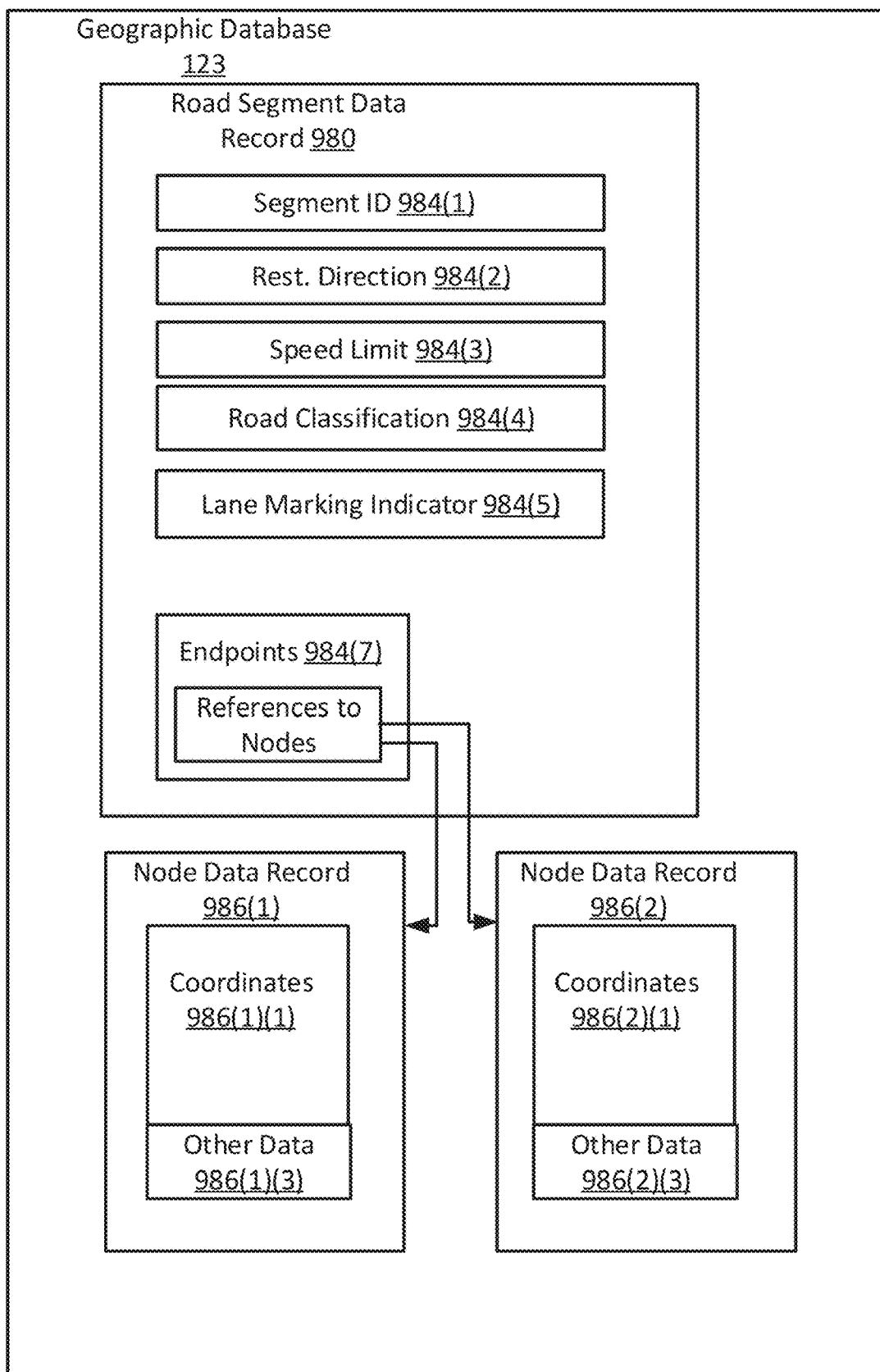
FIG. 12 illustrates an exemplary database.

FIG. 12 illustrates components of a road segment data record 980 contained in the geographic database 123 according to one embodiment. The road segment data record 980 may include a segment ID 984(1) by which the data record can be identified in the geographic database 123. Each road segment data record 980 may have associated information (such as "attributes", "fields", etc.) that describes features of the represented road segment. The road segment data record 980 may include data 984(2) that indicate the restrictions, if any, on the direction of vehicular travel permitted on the represented road segment. The road segment data record 980 may include data 984(3) that indicate a speed limit or speed category (i.e., the maximum permitted vehicular speed of travel) on the represented road segment. The road segment data record 304 may also include classification data 984(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 980 (or data entities) that describe current, historical, or future wireless network performance data for the road segment. Additional schema may be used to describe road objects. The attribute data may be stored in relation to geographic coordinates (e.g., the latitude and longitude) of the end points of the represented road segment. In one embodiment, the data 984(7) are references to the node data records 986 that represent the nodes corresponding to the end points of the represented road segment.

The road segment data record 980 may also include or be associated with other data that refer to various other attributes of the represented road segment. The various attributes associated with a road segment may be included in a single road segment record or may be included in more than one type of record which cross-references to each other. For example, the road segment data record may include data identifying what turn restrictions exist at each of the nodes which correspond to intersections at the ends of the road portion represented by the road segment, the name, or names by which the represented road segment is identified, the street address ranges along the represented road segment, and so on.

The road segment data record 908 may also include endpoints 984(7) that reference one or more node data records 986(1) and 986(2) that may be contained in the geographic database 123. Each of the node data records 986 may have associated information (such as "attributes", "fields", etc.) that allows identification of the road segment (s) that connect to it and/or its geographic position (e.g., its latitude and longitude coordinates). The node data records 986(1) and 986(2) include the latitude and longitude coordinates 986(1)(1) and 986(2)(1) for their node, the node data records 986(1) and 986(2) may also include other data 986(1)(3) and 986(2)(3) that refer to various other attributes of the nodes. In one example, the node data records 986(1) and 986(2) include the latitude and longitude coordinates 986(1)(1) and 986(2)(1) and the other data 986(1)(3) and 986(2)(3) reference other data associated with the node.

The controller 900 may communicate with a vehicle ECU which operates one or more driving mechanisms (e.g., accelerator, brakes, steering device). Alternatively, the mobile device 122 may be the vehicle ECU, which operates the one or more driving mechanisms directly.

The controller 800 or 900 may include a routing module including an application specific module or processor that calculates routing between an origin and destination. The routing module is an example means for generating a route in response to the anonymized data to the destination. The routing command may be a driving instruction (e.g., turn left, go straight), which may be presented to a driver or passenger, or sent to an assisted driving system. The display 914 is an example means for displaying the routing command. The mobile device 122 may generate a routing instruction based on the anonymized data.

The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. In some cases, the mobile device 122 may be a drone or other piloted or non-piloted aircraft. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, wireless network performance data, and maneuver data.

The geographic database 123 may contain at least one road segment database record 304 (also referred to as "entity" or "entry") for each road segment in a particular geographic region. The geographic database 123 may also include a node database record (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

The memory 804 and/or memory 904 may be a volatile memory or a non-volatile memory. The memory 804 and/or memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 818 and/or communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i)

to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network devices.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for adaptive routing comprising:
  sending, by a processor, a vehicle routing request;
  receiving, by the processor, a vehicle route in response to the vehicle routing request, the vehicle route traversing a plurality of path segments, wherein a first score is applied to each of the plurality of path segments having a first type of wireless network coverage and a second type of wireless network coverage and a second score is applied to each of the plurality of path segments having the second type of wireless network coverage for less than half of the corresponding path segment, wherein the vehicle route is based a first summation of scores for a first wireless network performance data for the plurality of path segments;
  receiving, by the processor, at a time after the vehicle route is received, a revised vehicle route based on a second summation of scores for a second wireless network performance data at the time after the vehicle route is received and after the first wireless network performance data is collected, for the plurality of path segments and caused by a change in vehicle traffic on the plurality of path segments, and wherein the revised vehicle route includes less than all of the plurality of path segments of the vehicle route, and
  enabling, by the processor, a driving assistance capability of the vehicle based on a driving assistance data requirement, the first wireless performance data, and the second wireless performance data,
  wherein a frequency at which the second wireless network performance data for the plurality of path segments is collected is based on a complexity of the vehicle route.

2. The method of claim 1, wherein the second wireless network performance data for one or more path segments excluded from the revised vehicle route fails to satisfy the driving assistance data requirement of the vehicle.

3. The method of claim 1, wherein the first wireless network performance data for a path segment of the one or more path segments excluded from the vehicle route and included in the revised vehicle route fails to satisfy the driving assistance data requirement of the vehicle, and
  wherein the second wireless network performance data for the path segment of the one or more path segments excluded from the vehicle route and included in the revised vehicle route satisfies the driving assistance data requirement of the vehicle.

4. The method of claim 1, further comprising:
  sending, by the processor, vehicle probe data including a speed, a driving assistance status, a wireless network connection status, or a combination thereof,
  wherein the vehicle route or the revised vehicle route are based on the vehicle probe data.

5. The method of claim 1, further comprising:
  determining, by the processor, that the second wireless network performance data for a path segment included in the vehicle route or the revised vehicle route fails to satisfy the driving assistance data requirement of the vehicle; and
  disabling, by the processor, the driving assistance capability of the vehicle prior to traversing the path segment.

6. The method of claim 5, wherein the first wireless network performance data and the second wireless network performance data include a measure of available bandwidth for the one or more path segments, and
wherein the driving assistance data requirement includes a required amount of bandwidth to enable the driving assistance capability.

7. The method of claim 5, further comprising:
determining, by the processor, that that the second wireless network performance data for a further path segment included in the vehicle route or the revised vehicle route satisfies a driving assistance data requirement of the vehicle; and
enabling, by the processor, the driving assistance capability of the vehicle while traversing the path segment.

8. The method of claim 7, wherein the driving assistance capability is a driver-input-less driving assistance capability.

9. The method of claim 1, wherein the first wireless network performance data represents network performance for the plurality of path segments before or at the time the vehicle routing request was sent.

10. The method of claim 1, wherein the second wireless network performance data represents a state of the wireless network for the plurality of path segments at a time subsequent to the first wireless network performance data.

11. A method for adaptive routing comprising:
sending, by a processor, a vehicle routing request;
receiving, by the processor, a vehicle route in response to the vehicle routing request, the vehicle route traversing a plurality of path segments, wherein a first score is applied to each of the plurality of path segments having a first type of wireless network coverage and a second type of wireless network coverage and a second score is applied to each of the plurality of path segments having the second type of wireless network coverage for less than half of the corresponding path segment, wherein the vehicle route is based on a first summation of scores for a first wireless network performance data for the plurality of path segments;
receiving, by the processor, at a time after the vehicle route is received, a revised vehicle route based on a second summation of scores for a second wireless network performance data at the time after the vehicle route is received and after the first wireless network performance data is collected, for the plurality of path segments and caused by a change in vehicle traffic on the plurality of path segments, and wherein the revised vehicle route includes less than all of the plurality of path segments of the vehicle route; and
determining, by the processor, whether to enable or disable driving assistance capability of the vehicle based on a driving assistance data requirement of the vehicle, the first wireless network performance data, and the second wireless network performance data,
wherein a frequency at which the second wireless network performance data for the plurality of path segments is collected is based on a route complexity.

12. The method of claim 11, wherein the second wireless network performance data for one or more path segments excluded from the revised vehicle route fails to satisfy the driving assistance data requirement of the vehicle.

13. The method of claim 11, wherein the first wireless network performance data for a path segment of the one or more path segments excluded from the vehicle route and included in the revised vehicle route fails to satisfy the driving assistance data requirement of the vehicle, and
wherein the second wireless network performance data for the path segment of the one or more path segments excluded from the vehicle route and included in the revised vehicle route satisfies the driving assistance data requirement of the vehicle.

14. The method of claim 11, further comprising:
sending, by the processor, vehicle probe data including a speed, a driving assistance status, a wireless network connection status, or a combination thereof,
wherein the vehicle route or the revised vehicle route are based on the vehicle probe data.

15. The method of claim 11, further comprising:
determining, by the processor, that the second wireless network performance data for a path segment included in the vehicle route or the revised vehicle route fails to satisfy the driving assistance data requirement of the vehicle; and
disabling, by the processor, the driving assistance capability of the vehicle prior to traversing the path segment.

16. The method of claim 15, wherein the first wireless network performance data and the second wireless network performance data include a measure of available bandwidth for the one or more path segments, and
wherein the driving assistance data requirement includes a required amount of bandwidth to enable the driving assistance capability.

17. The method of claim 15, further comprising:
determining, by the processor, that the second wireless network performance data for a further path segment included in the vehicle route or the revised vehicle route satisfies the driving assistance data requirement of the vehicle; and
enabling, by the processor, the driving assistance capability of the vehicle while traversing the path segment.

18. The method of claim 17, wherein the driving assistance capability is a driver-input-less driving assistance capability.

19. The method of claim 11, wherein the first wireless network performance data represents network performance for the plurality of path segments before or at the time the vehicle routing request was sent.

20. The method of claim 11, wherein the second wireless network performance data represents a state of the wireless network for the plurality of path segments at a time subsequent to the first wireless network performance data.

* * * * *